United States Patent
Nichols et al.

(10) Patent No.: US 8,242,730 B2
(45) Date of Patent: Aug. 14, 2012

(54) AUTOMATED ROBOT TEACH TOOL AND METHOD OF USE

(76) Inventors: Michael J. Nichols, Brookline, MA (US); Louis J. Guarracina, Newburyport, MA (US)

( * ) Notice: Subject to any disclaimer, the term of this patent is extended or adjusted under 35 U.S.C. 154(b) by 584 days.

(21) Appl. No.: 12/480,943

(22) Filed: Jun. 9, 2009

(65) Prior Publication Data

US 2009/0302795 A1   Dec. 10, 2009

Related U.S. Application Data

(60) Provisional application No. 61/060,306, filed on Jun. 10, 2008.

(51) Int. Cl.
*B25J 9/18* (2006.01)

(52) U.S. Cl. .................. 318/568.11; 318/568.16; 901/2; 901/3; 901/9; 901/23; 901/24; 901/30; 901/31; 901/32; 901/37; 901/46; 700/245; 700/213; 700/252; 700/253; 700/254; 700/255; 700/258; 700/259; 700/262; 700/263

(58) Field of Classification Search ............ 318/568.11, 318/568.16, 568.21, 568.23, 652, 653; 700/259, 700/213, 219, 220, 245, 252–255, 258, 262, 700/263; 414/783, 784, 935, 936, 940, 941, 414/225.01, 729; 901/46, 47, 2, 3, 9, 23, 901/24, 30, 31, 32, 37

See application file for complete search history.

(56) References Cited

U.S. PATENT DOCUMENTS

| | | | |
|---|---|---|---|
| 4,506,448 A | 3/1985 | Topping et al. | |
| 4,642,752 A | 2/1987 | Debarbieri et al. | |
| 5,308,222 A * | 5/1994 | Bacchi et al. | 414/783 |
| 5,740,328 A * | 4/1998 | Ravani et al. | 700/258 |
| 6,075,334 A * | 6/2000 | Sagues et al. | 318/568.11 |
| 6,160,338 A * | 12/2000 | Ono | 310/309 |
| 6,242,879 B1 * | 6/2001 | Sagues et al. | 318/567 |
| 6,243,621 B1 * | 6/2001 | Tao et al. | 700/245 |
| 6,285,920 B1 | 9/2001 | McGee et al. | |
| 6,313,596 B1 * | 11/2001 | Wyka et al. | 318/640 |
| 6,323,616 B1 * | 11/2001 | Sagues et al. | 318/568.11 |
| 6,360,144 B1 * | 3/2002 | Bacchi et al. | 700/250 |
| 6,366,830 B2 * | 4/2002 | Bacchi et al. | 700/250 |
| 6,587,743 B1 * | 7/2003 | White et al. | 700/121 |
| 6,591,160 B2 | 7/2003 | Hine et al. | |
| 6,752,585 B2 * | 6/2004 | Reimer et al. | 414/783 |
| 6,845,292 B2 * | 1/2005 | Sha et al. | 700/218 |
| 6,996,456 B2 * | 2/2006 | Cordell et al. | 700/258 |
| 7,039,498 B2 | 5/2006 | Bacchi et al. | |
| 7,153,088 B2 * | 12/2006 | Reimer et al. | 414/783 |
| 2002/0150450 A1 * | 10/2002 | Bevirt et al. | 414/225.01 |
| 2008/0027580 A1 | 1/2008 | Zhang et al. | |

FOREIGN PATENT DOCUMENTS

| FR | 2684912 | 6/1993 |
|---|---|---|
| JP | 60163108 | 8/1985 |

OTHER PUBLICATIONS

"MicroTeach", HighRes Biosolutions, retrieved from http://www.highresbio.com/systems/microteach.html May 15, 2009.

* cited by examiner

*Primary Examiner* — Rita Leykin

(74) *Attorney, Agent, or Firm* — Hoffman Warnick LLC

(57) ABSTRACT

A robot teach tool is provided that enables automatic teaching of pick and place positions for a robot. The automated robot teach tool obviates the need for manual operation of the robot during the teaching. The result is an automated process that is much faster, more accurate, more repeatable and less taxing on a robot operator.

29 Claims, 24 Drawing Sheets

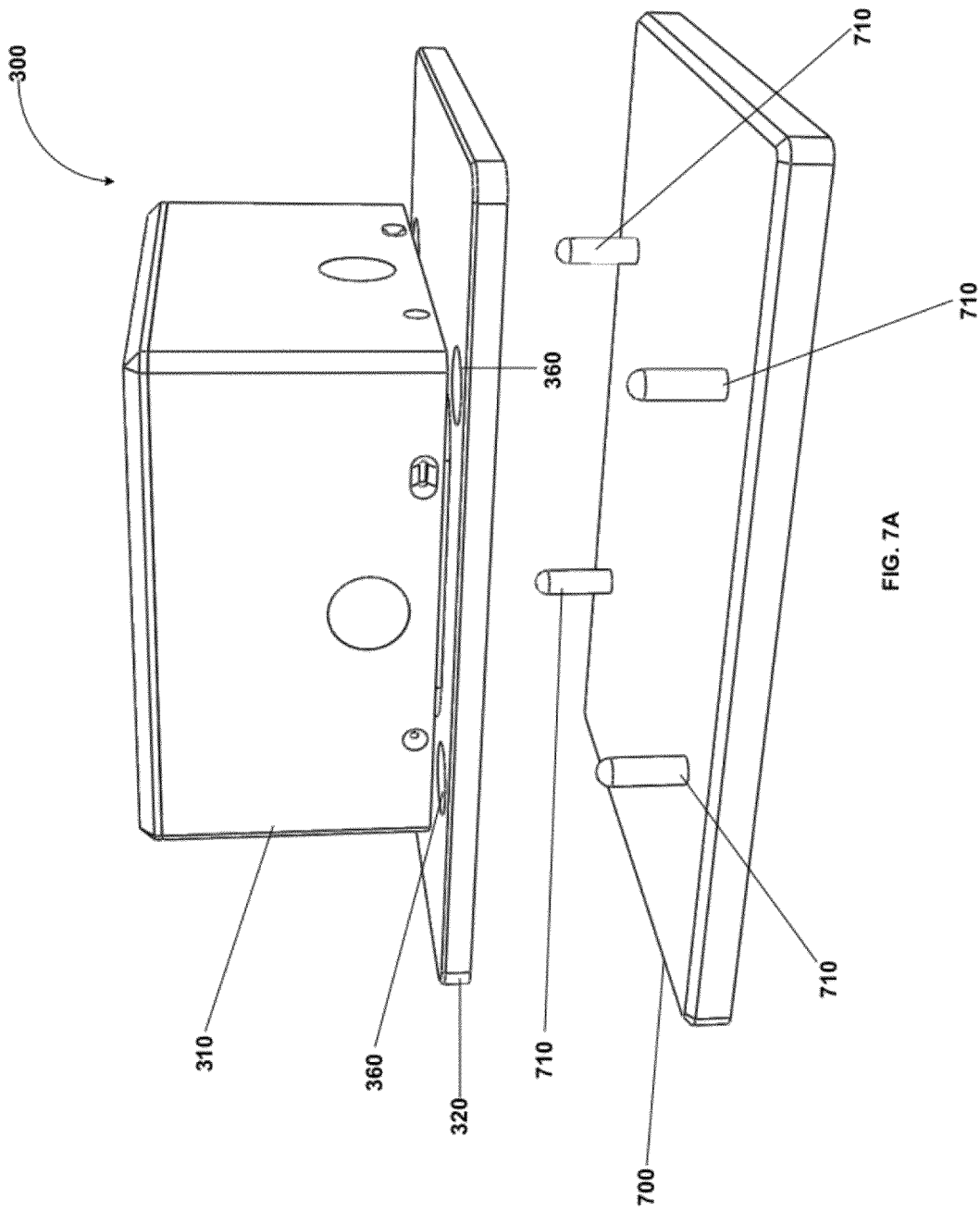

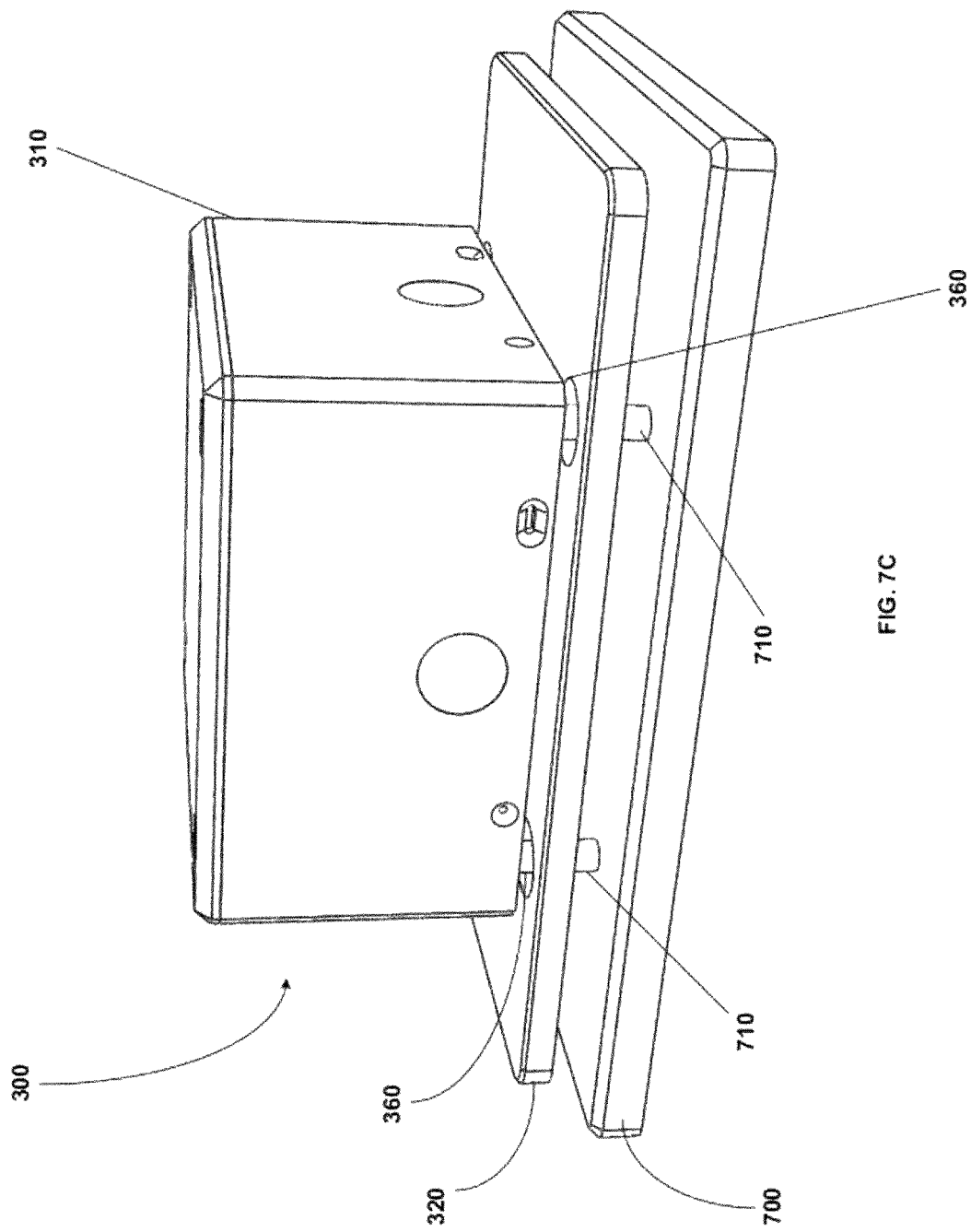

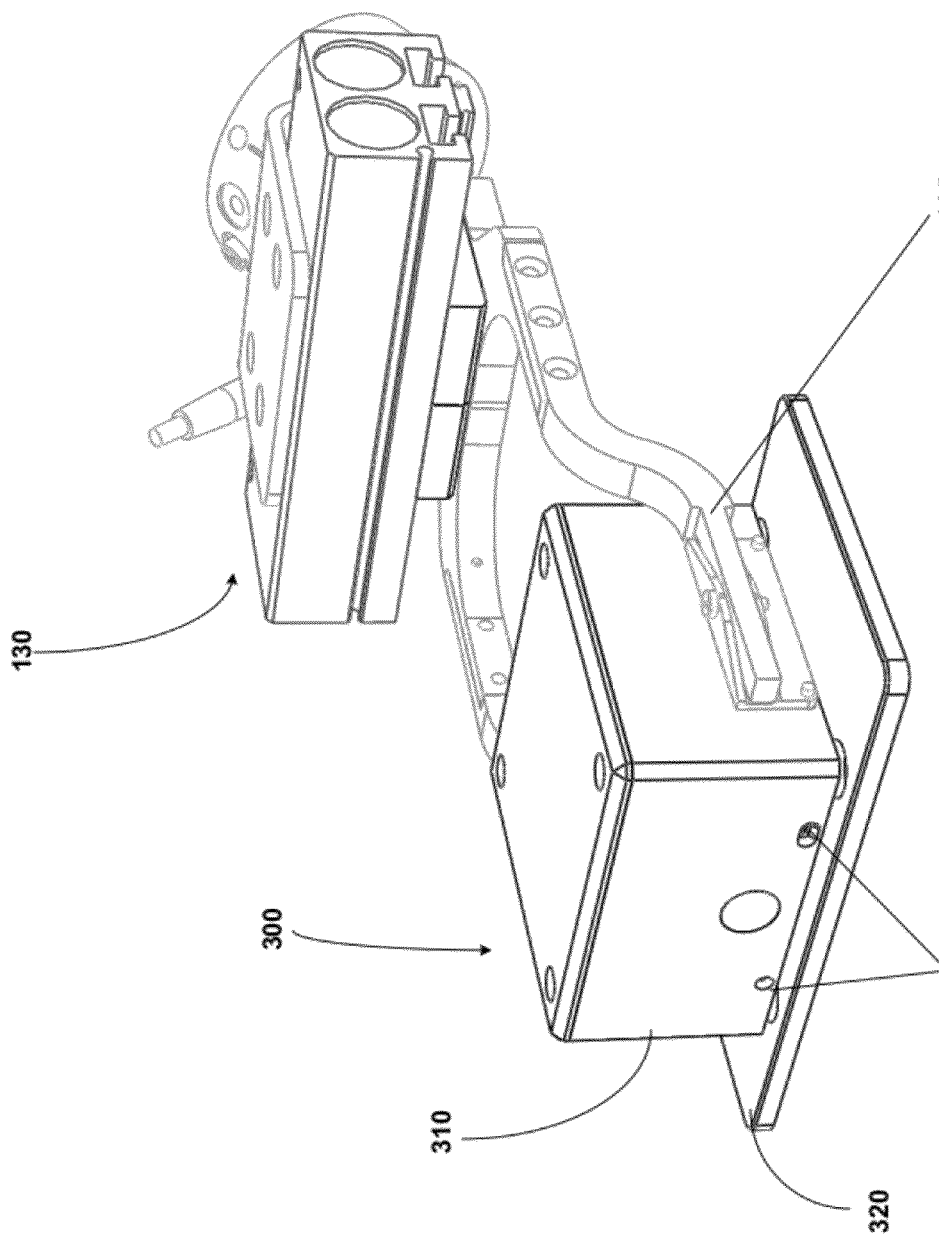

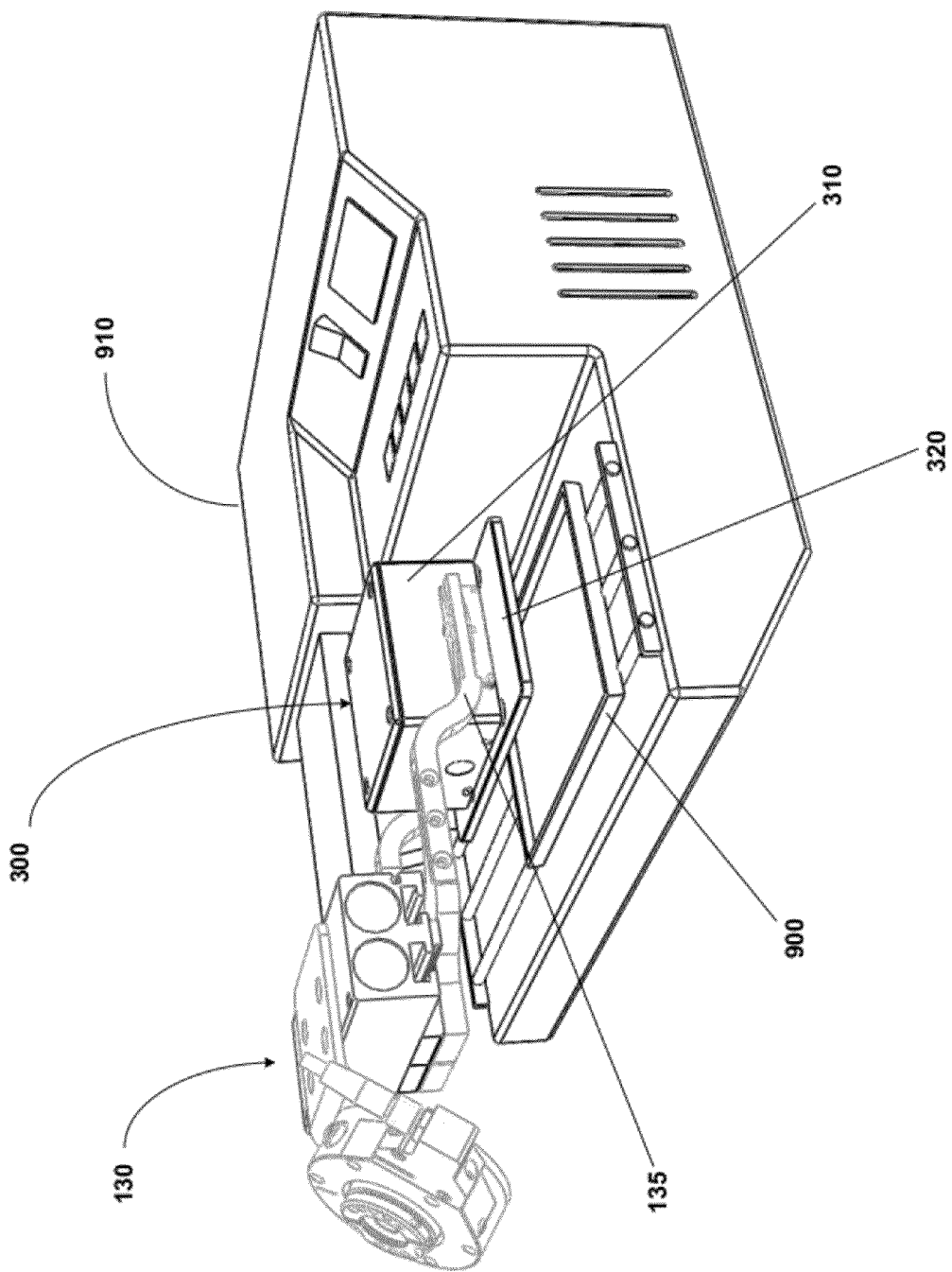

AUTOMATED ROBOT TEACH TOOL AND METHOD OF USE

CROSS-REFERENCE TO RELATED APPLICATIONS

This application claims the benefit of U.S. Provisional Application Ser. No. 61/060,306 filed on Jun. 10, 2008, and entitled "ROBOT AUTOTEACH TOOL AND METHOD OF USE," which is incorporated by reference herein in its entirety.

BACKGROUND

This disclosure relates generally to robotic workcells and more specifically to an automated robot teach tool that enables a robot to automatically program all of the pick and place positions associated with a robotic workcell without robot operator intervention.

One of the most time-consuming and arduous aspects of setting up a robotic workcell is programming all of the robot's pick and place positions. A large automated cell could have dozens of points that must be manually taught. The operator, by using various buttons on a teach pendant, that typically takes the form of a hand-held device, can move a robot's end effector through six degrees of freedom to align the end effector within an acceptable tolerance to a given pick/place position. This process is repeated for each position. The speed and accuracy of this operation is subject to many factors including experience, fatigue, and visual acuity of the robot operator. Other factors that affect the speed and accuracy of the teaching operation include the ability of the robot operator to view a given pick/place point up close and from beneficial orientations, and room lighting in which the robot is taught.

The nature of this type of manual teaching operation means that some points will not be taught as well as others. As a result, some robot picks or places may be "rough" during operation of the robot. That is, the picked or placed object might hit, to varying degrees, a nearby surface on the way into or out of the taught point. Consequently, such taught points often need to be refined by the robot operator one or more times to increase the accuracy of the point.

The task of teaching points in a modular robotic workcell is exponentially more onerous. In a modular robotic workcell design, mobile, dockable carts are quickly and easily moved to and from robotic workcells where various process operations are performed on workpieces or objects that are carried by these carts. A typical modular robotic workcell design can require a robot operator to teach hundreds of points, each of which can take anywhere from 10 to 30 minutes to teach. The result is that time spent initially teaching a modular workcell system can take anywhere from a few hours for a small, monolithic system, to a week or more for large, modular systems. Furthermore, this teaching is not a one-time operation. For example, if an end effector or robot becomes damaged and needs to be replaced, then the entire workcell must be retaught, which will take just as long and require as much effort as the initial teaching exercise.

SUMMARY

In one embodiment, there is a robot teach tool. In this embodiment, the automated robot teach tool comprises a body assembly with a proximity sensor mounted therein that is releasably mated with a robot end effector. A foot assembly is coupled to the body assembly, wherein the foot assembly comprises a sensor target mounted therein that is located about the proximity sensor. In this embodiment, the proximity sensor and the sensor target are configured to detect signals representative of a perturbation as the robot end effector moves the body assembly and foot assembly from a central position within a workpiece receptacle through six degrees of freedom, wherein the signals are used to determine a precise orientation for the robot end effector to pick up and place a workpiece to and from the workpiece receptacle.

In a second embodiment, there is a system for automatically teaching a robot a plurality of pick and place positions. In this embodiment, the system comprises a robot teach tool comprising a body assembly with a proximity sensor mounted therein and a foot assembly coupled to the body assembly. The foot assembly comprises a sensor target mounted therein that is located about the proximity sensor. The system further comprises a robot controller that controls operation of the robot, wherein the robot controller directs a robot end effector to pick up the robot teach tool and move the robot teach tool from a central position within a workpiece receptacle through six degrees of freedom. The robot controller comprises a robot orienter that receives perturbation signals from the proximity sensor as the robot end effector moves the robot teach tool from the central position within the workpiece receptacle through the six degrees of freedom and determines a precise orientation of the plurality of pick and place positions from the perturbation signals.

In a third embodiment, there is a method for automatically teaching a robot a plurality of pick and place positions for a workstation located about the robot. In this embodiment, the method comprises: providing a robot teach tool; directing a robot end effector to pick up the robot teach tool; directing the robot end effector to move the robot teach tool towards a workpiece receptacle located at the workstation to a central position and from the central position, to a place position in all six degrees of freedom; receiving perturbation signals detected from the teach tool as the robot end effector moves the robot teach tool from the central position with the workpiece receptacle through six degrees of freedom; and determining a precise orientation of the plurality of pick and place positions for the workpiece receptacle from the perturbation signals.

In a fourth embodiment, there is a modular robotic system. In this embodiment, the modular robotic system comprises: a plurality of robotic modular workstations; a robot that moves material to and from each of the plurality of robotic modular workstations; and a robot teach tool configured to interact with the plurality of modular robotic workstations and the robot, wherein the robot teach tool facilitates automatic learning of pick and place locations of each of the plurality of modular robotic workstations.

In a fifth embodiment, there is a method for automatically teaching a plurality of pick and place positions for a modular robotic system having a plurality of modular robotic workstations and a robot that moves material to and from each of the plurality of modular robotic workstations, the method comprising: providing a robot teach tool; directing the robot to pick up the robot teach tool; directing the robot to move the robot teach tool towards a workpiece receptacle located at one of the plurality of modular robotic workstations; directing the robot teach tool to a central position within the workpiece receptacle and from the central position, to a place position in all six degrees of freedom; receiving perturbation signals detected from the robot teach tool as the robot end moves the robot teach tool from the central position with the workpiece receptacle through six degrees of freedom; and determining a precise orientation of the plurality of pick and place positions for the workpiece receptacle from the perturbation signals.

BRIEF DESCRIPTION OF THE DRAWINGS

FIGS. 7A-7C show the assembly of the robot teach tool with a parking station according to one embodiment of the present disclosure;

FIG. 8 shows a schematic diagram of a robot end effector holding the robot teach tool of the present disclosure after removal from the parking station;

FIG. 9 shows a schematic diagram of a robot end effector with the robot teach tool entering a workpiece receptacle associated with an instrument used within a robotic workcell according to one embodiment of the present disclosure;

DETAILED DESCRIPTION

Figure 1:
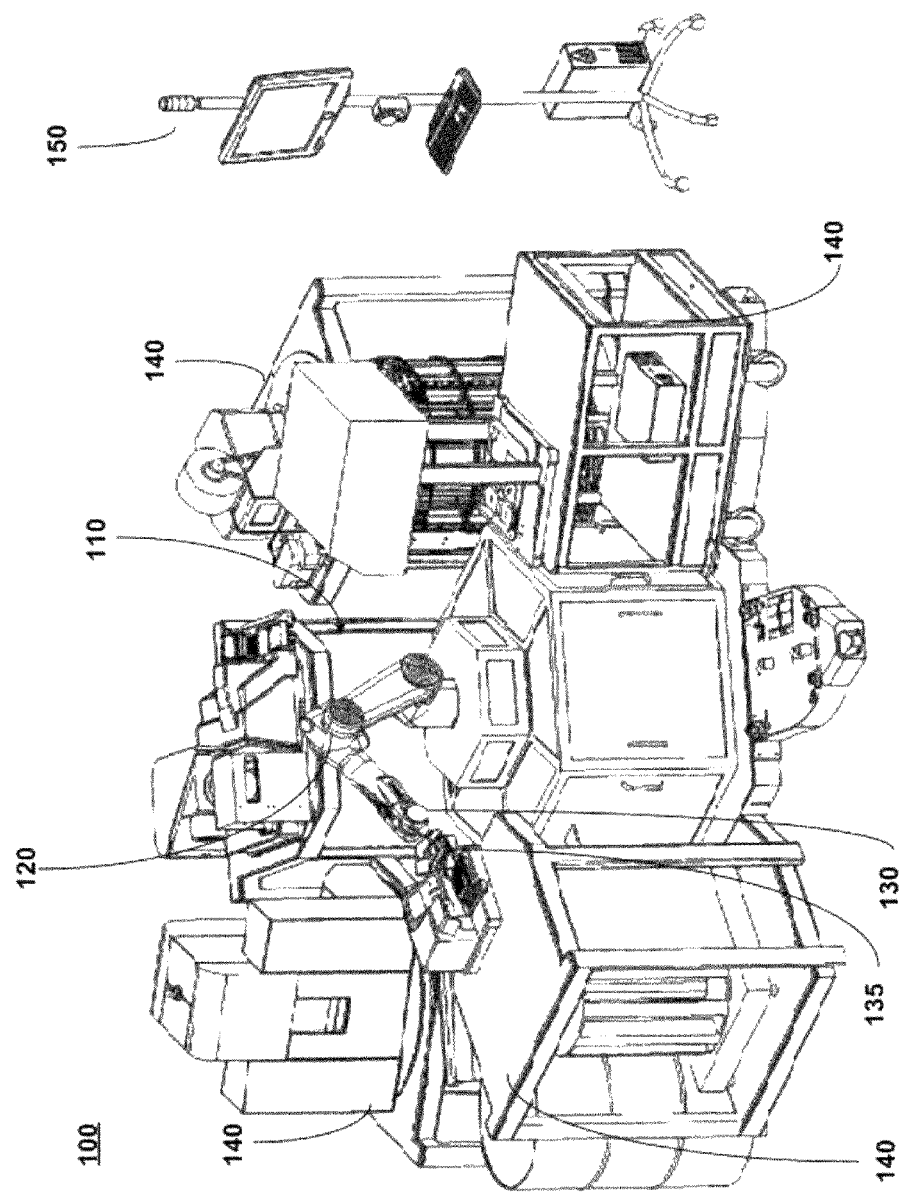
FIG. 1 shows a schematic diagram of a robotic workcell in which a robot teach tool of the present disclosure can be used to automatically teach pick and place positions.

FIG. 1 shows a schematic diagram of a robotic workcell 100 in which a robot teach tool of the present disclosure can be used to teach pick and place positions. As shown in FIG. 1, robotic workcell 100 includes a robot 110 having an articulated robotic arm 120 with an end effector 130 and grippers 135 at one end that performs various functions such as placing and picking up objects to and from a plurality of workstations 140 that are positioned in locations that are in proximity to robot 110. For ease of illustration, FIG. 1 only shows five workstations 140 located in proximity to robot 110. Those skilled in the art recognize that more or less workstations can be used. Furthermore, those skilled in the art will recognize that the configuration of the robotic workcell 100 shown in FIG. 1 is only for illustrative purposes, and that other configurations are possible. Although not shown in FIG. 1, a robot controller is connected to robot 110 through an electrical connection or wireless communication that controls the movements and operations performed by the robot. A computer 150 provided with a memory and software describing a plurality of programmed operations to be performed, causes robot 110 via the robot controller to move in prescribed movements to perform the various operations assigned to each workstation 140. Although not shown in FIG. 1, a control system is coupled to workstations 140, computer 150 and the robot controller in order to provide a communication and operating supplies (electricity, pneumatic, vacuum, etc.) link therebetween. Those skilled in the art will recognize that additional hardware (e.g., sensors, drives, etc.) not discussed herein may be found in robotic workcell 100.

A drug discovery system is one particular area in which the robotic workcell 100 of FIG. 1 can be used. In one example, a variety of instruments located on workstations 140 are used to process various chemical compounds. In operation, end effector 130 using grippers 135 picks up and places various kinds of microtiter plates from workpiece receptacles located at workstations 140 so that the chemical compounds can be mixed for drug discovery purposes. As used herein a workpiece receptacle is a receptacle, usually located in or on an automated instrument or device, into which a workpiece (e.g., a microtitre plate) can be placed, and from which a workpiece can be picked, either by a human operator or a robot. Although the description that follows for the robotic workcell 100 and the robot teach tool of the present disclosure is in a drug discovery environment, those skilled in the art will recognize that robotic workcell 100 and the robot teach tool of the present disclosure is not limited to drug discovery systems and is suitable for use in any environment in which a robot can be used to perform process operations on a workpiece or object located at a workstation.

Figure 2:
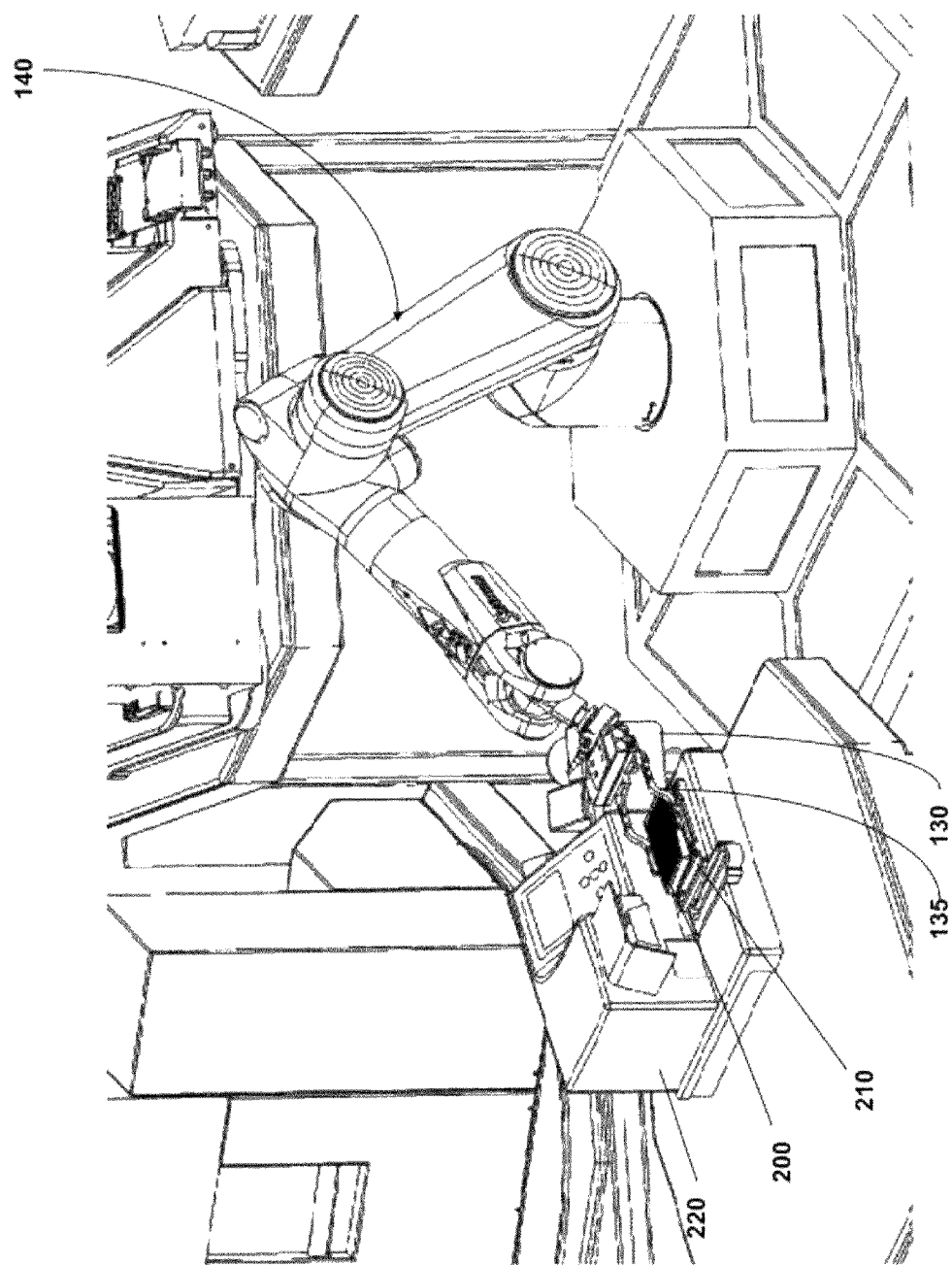
FIG. 2 shows a schematic diagram of a robot end effector shown in FIG. 1 holding a microtiter plate that is moved to and from a typical workpiece receptacle utilized by a particular drug discovery instrument.

FIG. 2 shows a schematic diagram of robot end effector 130 and grippers 135 of robot 110 shown in FIG. 1 holding a microtiter plate 200 that is moved to and from a typical workpiece receptacle 210 utilized by a drug discovery instrument 220. Before grippers 135 of end effector 130 can pick and place microtiter plate 200 from workpiece receptacle 210 of instrument 220, the pick and place positions from the workpiece receptacles need to be taught and programmed beforehand. Note that these workpiece receptacles take various forms, but are generally characterized by a flat, horizontal surface or set of surfaces onto which a workpiece such as a microtiter plate can rest. These workpiece receptacles are also characterized by a set of vertical surfaces at the perimeter which together define a shape slightly larger than the footprint of a microtiter plate, which serves to fix the plate in a repeatable position within the workpiece receptacle. Also, these workpiece receptacles have some sort of chamfer or lead-ins at the top of the vertical surfaces that act to guide a microtiter plate being placed into the nest in case of slight inaccuracies in the robot's taught point.

Programming pick and place positions for these workpiece receptacles is typically a time-consuming and arduous task that involves using a teach pendant to manually move robot end effector 130 through six degrees of freedom to align the end effector within an acceptable tolerance to a given pick/place position. This process is repeated for each position for all of the workpiece receptacles associated with the instruments utilized in the robotic workcell. The speed and accuracy of programming the pick and place positions for these workpiece receptacles is subject to many factors including experience, fatigue, and visual acuity of the robot operator. As a result, this type of manual teaching means that some points will not be taught as well as others. Consequently, some robot picks or places may be rough during operation and require subsequent refinement by the robot operator one or more times to increase the accuracy of the point.

Figure 3:
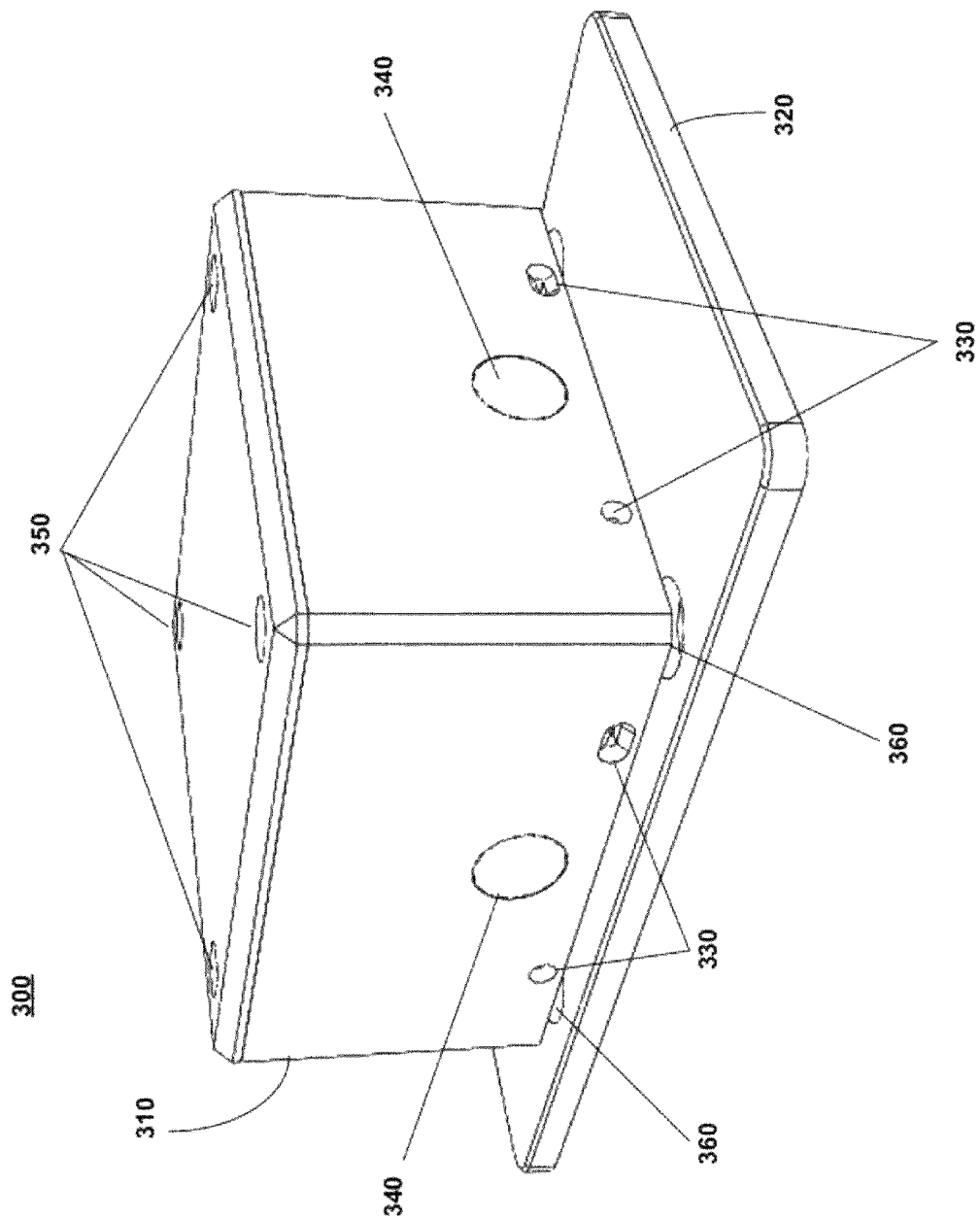
FIG. 3 shows a perspective view of a robot teach tool according to one embodiment of the present disclosure.

As shown herein, the robot teach tool of the present disclosure is able to teach workpiece receptacle positions in substantially less time than conventional programming methods without requiring operator assistance. In addition, the robot teach tool can teach such positions with a much higher degree of precision (e.g., X, Y, Z, pitch, roll and yaw) than is possible using manually taught points with a robot teach pendant. FIG. 3 shows a perspective view of a robot teach tool 300 according to one embodiment of the present disclosure. As shown in FIG. 3, the teach tool 300 comprises a body assembly 310 coupled to a foot assembly 320. In one embodiment, body assembly 310 is coupled to foot assembly 320 through a pocket and bearing assembly which is described below.

Body assembly 310 and foot assembly 320 contain the components which are described below that facilitate the automatic teaching of the pick and place points. In one embodiment as shown in FIG. 3, body assembly 310 is a square housing that can be made of aluminum, stainless steel, a rigid plastic, or any other rigid material. Those skilled in the art will recognize that the shapes and materials used to form body assembly 310 are only illustrative of one particular configuration and that it is possible to utilize different shaped elements, as well as use different materials than those mentioned above.

FIG. 3 also shows that body assembly 310 further comprises registration features 330 located on the lower half of each side of the body assembly. Small pins in the robot gripper are received by registration features 330, which allows the robot to precisely and repeatably grip the teach tool 300. In one embodiment as shown in FIG. 3, each side of body assembly 310 contains two registration features 330 located at the bottom. Those skilled in the art will recognize that the amount and location of registration features 330 is illustrative of one configuration and is not meant to be limiting. As will be explained below in reference to FIG. 4, bearings 340 located between registration features 330 are used to couple with bearing pockets formed in foot assembly 320. Body assembly 310 further comprises fastening element holes 350 located on its top that are configured to receive fastening elements such as a threaded screw that facilitates coupling with foot assembly 320. In one embodiment as shown in FIG. 3, a fastening element hole 350 is located at each corner of the top of body assembly 310. Those skilled in the art will recognize that the amount and location of fastening element holes 350 is illustrative of one configuration and is not meant to be limiting.

Foot assembly 320 as shown in FIG. 3 has a rectangular shape that facilitates interaction with the workpiece receptacles of the drug discovery instruments deployed at workstations 140 (FIG. 1). In one embodiment, foot assembly 320 has a length and width that are larger than the length and width of the body assembly 310. Foot assembly 320 comprises parking station holes 360 that as shown below, are used to facilitate coupling with a parking station. In one embodiment, foot assembly 320 is formed from aluminum, stainless steel, rigid plastic, or any other rigid material. Those skilled in the art will recognize that the shapes and materials used to form foot assembly 320 are only illustrative of one particular configuration and that it is possible to utilize different shaped elements, as well as use different material than those mentioned above.

Figure 4:
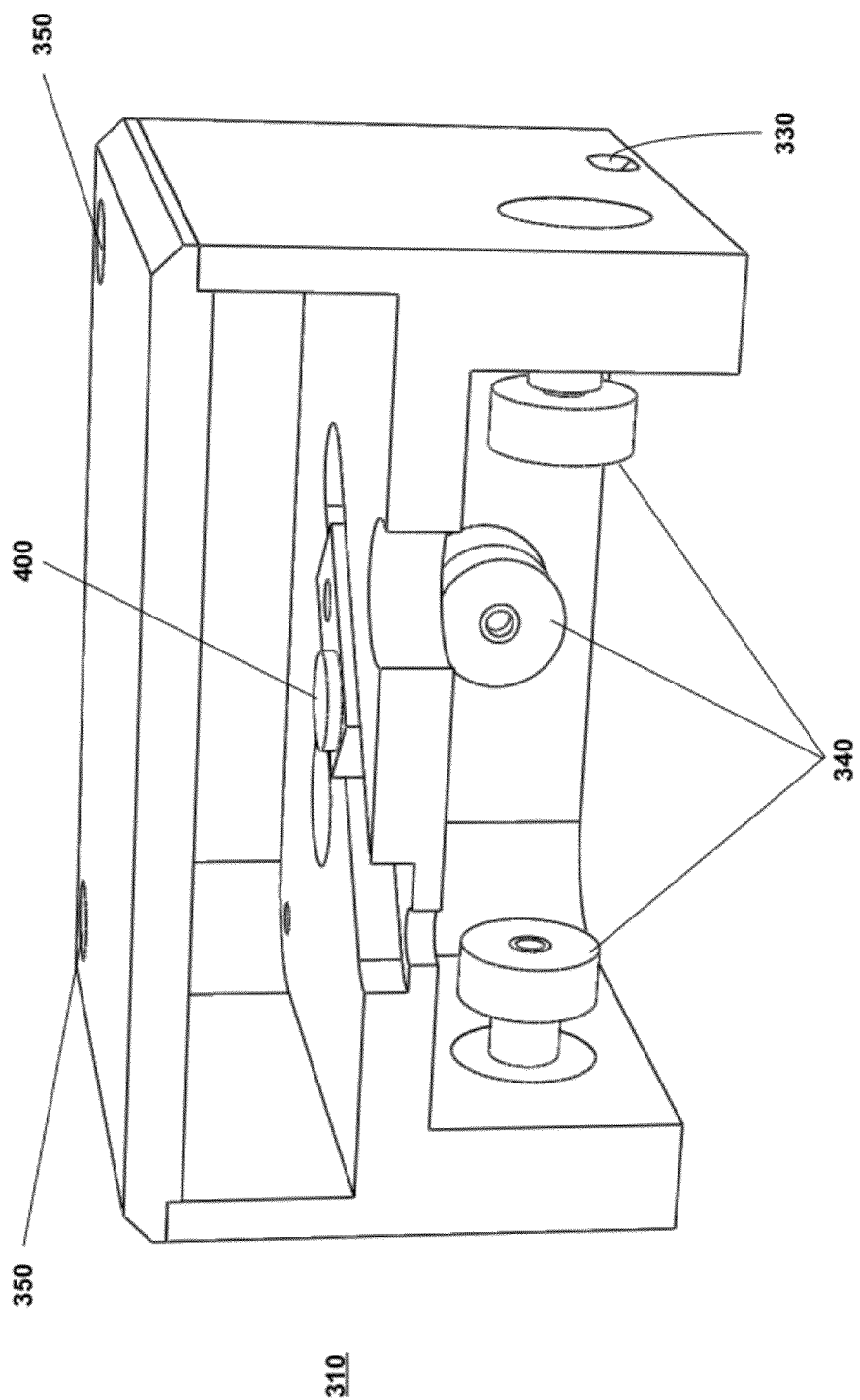
FIG. 4 shows a cutaway view of the body assembly of the robot teach tool shown in FIG. 3 according to one embodiment of the present disclosure.

FIG. 4 shows a cutaway view of the body assembly 310 of the robot teach tool 300 shown in FIG. 3 according to one embodiment of the present disclosure. As shown in FIG. 4, body assembly 310 comprises a proximity sensor 400 mounted therein with plurality of bearings 340 used to support operative cooperation with foot assembly 320. In one embodiment, proximity sensor 400 is an inductive proximity sensor. In other embodiments, proximity sensor 400 may comprise capacitive, magnetic, or reflective proximity sensors, or a mechanical switch. In one embodiment, as shown in FIG. 4, there are three bearings 340 for coupling with bearing pockets formed in foot assembly 320 that are discussed below. Note that although FIG. 4 shows three bearings, there is a fourth bearing that is not shown in the figure. Moreover, those skilled in the art will recognize that more or less bearings 340 may be used than what is disclosed in FIG. 4.

In one embodiment, the proximity sensor 400 requires an electrical power input and provides an electrical signal output of its state. In order to accommodate such a configuration, the power and data are wired to the robot teach tool 300 from the forearm of the robot (not shown in the figures). The wiring from the forearm of the robot continues through to the base of the robot and out to an electrical cabinet (not shown in the figures), which provides the power to the robot teach tool 300 and routes the data line to the robot controller.

Figure 5:
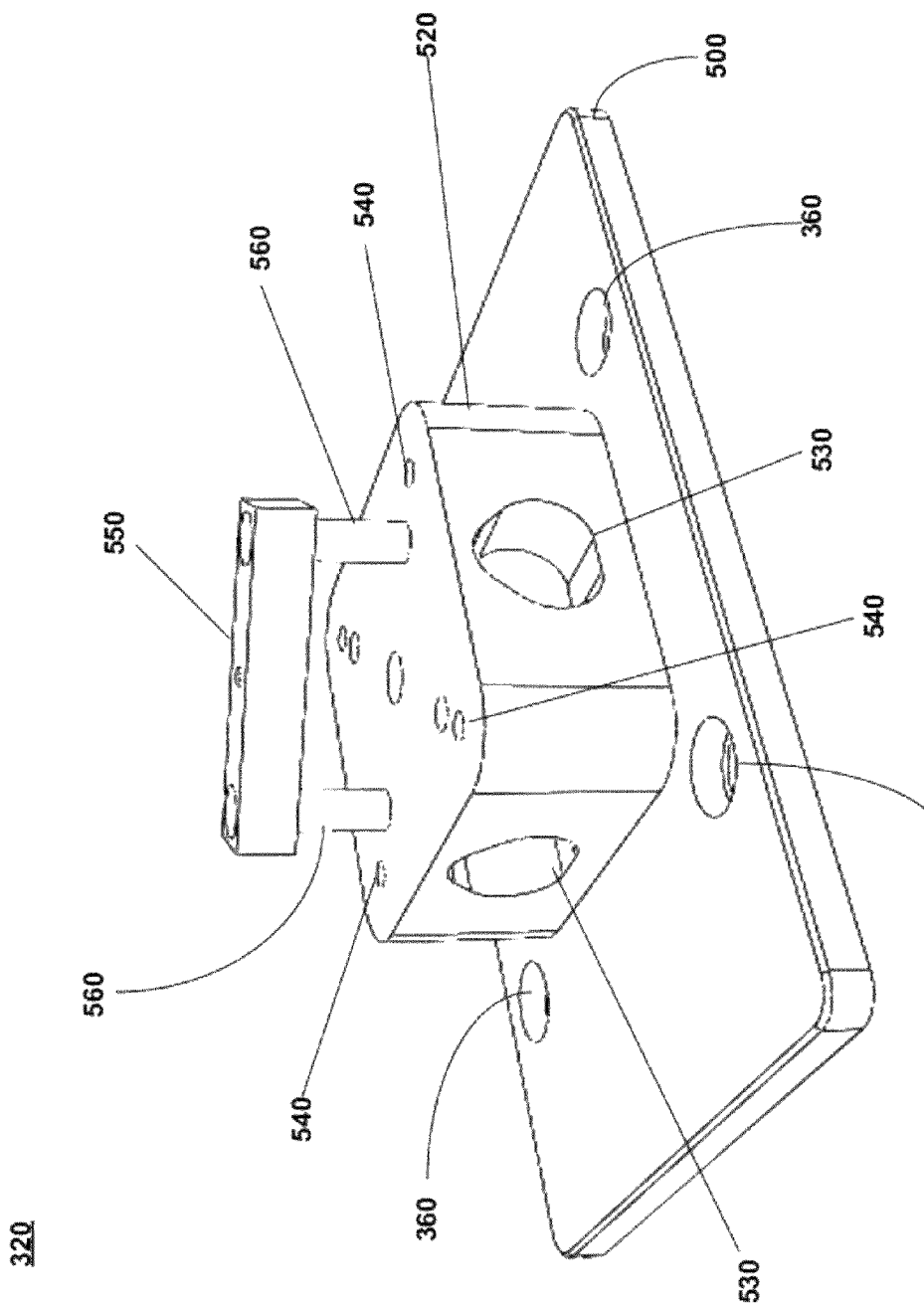
FIG. 5 shows a cutaway view of the foot assembly of the robot teach tool shown in FIG. 3 according to one embodiment of the present disclosure.

FIG. 5 shows a cutaway view of foot assembly 320 of the robot teach tool 300 shown in FIG. 3 according to one embodiment of the present disclosure. As shown in FIG. 5, foot assembly 320 comprises a base section 500 having parking station holes 360 formed therein for coupling to body assembly 310 and a parking station which is described below. In one embodiment, base section 500 has a rectangular shape and there are four parking station holes 360 formed therein (note that only three are shown in FIG. 5, but the fourth is not in view). Those skilled in the art will recognize that the shape and number of parking station holes 360 are only illustrative of one particular configuration and that it is possible to utilize a different shaped base section 500, as well as have a different number of parking station holes 360 than those disclosed in FIG. 5. A sensor target platform 520 is placed on base section 500. In one embodiment, as shown in FIG. 5, sensor target platform 520 is positioned on base section 500 between parking station holes 360. Sensor target platform 520 comprises bearing pockets 530 on each of its sides that receive bearings 340 from foot assembly 310 (see FIG. 4). Note that the number of bearing pockets 530 in sensor target platform 520 will correspond with the number of bearings 340 utilized by foot assembly 310. In addition, sensor target platform 520 comprises fastening element holes 540 that are configured to accommodate fastening elements inserted through fastening element holes 350 formed in body assembly 310. A sensor target 550 is supported above sensor target platform 520 via platform posts 560. In one embodiment, sensor target 550 is a metal bar. In other embodiments, sensor target 550 may comprise reflective material. Those skilled in the art will recognize that the selection of sensor target 550 will depend on what type of sensor is used for proximity sensor 400. For example, a capacitive or photoelectric sensor might be suitable for a plastic target, while an inductive proximity sensor requires a metal target.

Figure 6:
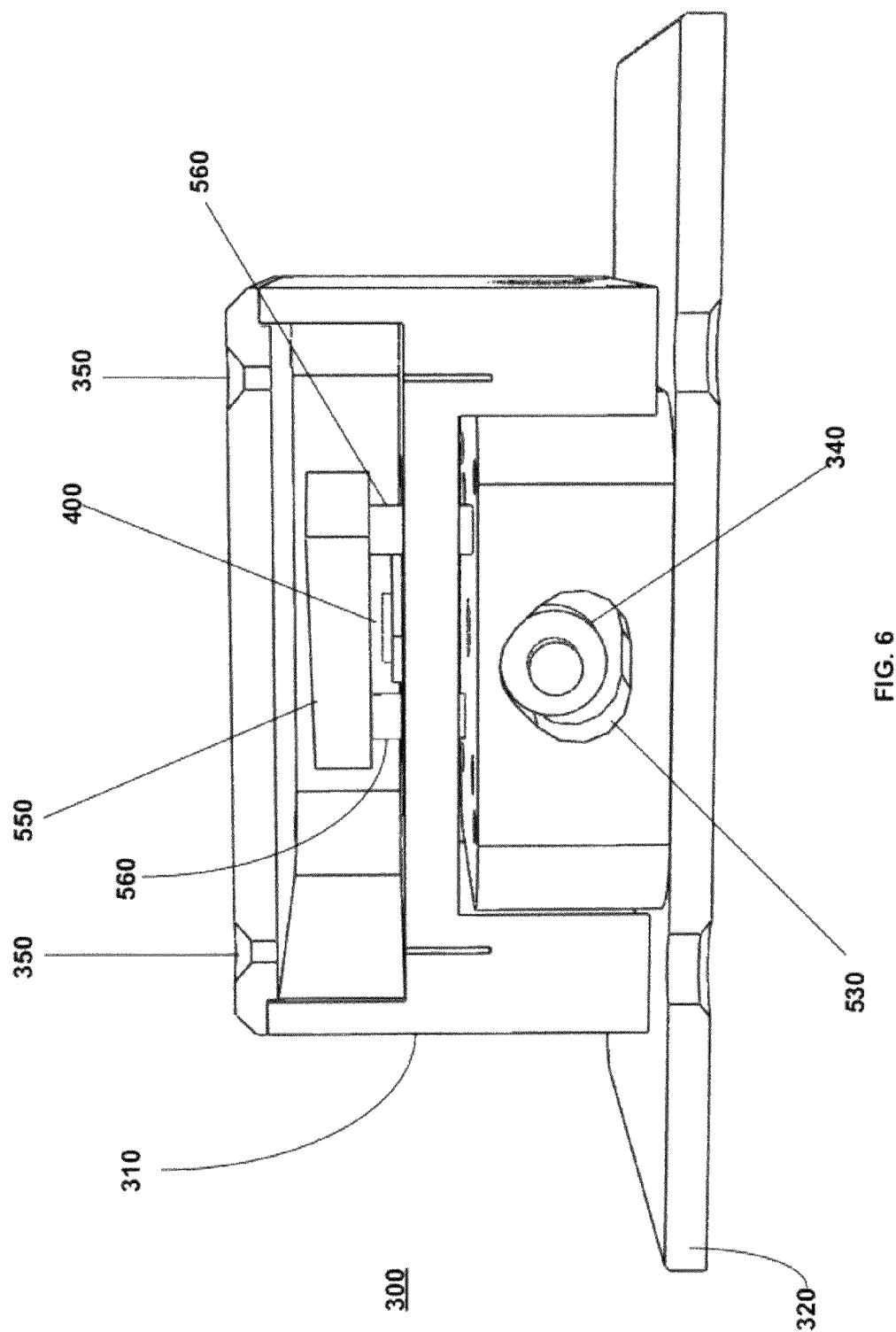
FIG. 6 shows a cutaway view of the overall robot teach tool including the body assembly shown in FIG. 4 and the foot assembly shown in FIG. 5 according to one embodiment of the present disclosure.

FIG. 6 shows a cutaway view of the robot teach tool 300 including the body assembly 310 shown in FIG. 4 and the foot assembly 320 shown in FIG. 5 according to one embodiment of the present disclosure. As shown in FIG. 6, the sensor target 550 of the foot assembly 320 is located above the proximity sensor 400 once the body assembly 310 has been coupled to the foot assembly 320 via bearings 340 and bearing pockets 530, respectively, and fastening elements have been inserted through fastening element holes 350 and 540.

Figure 7B:
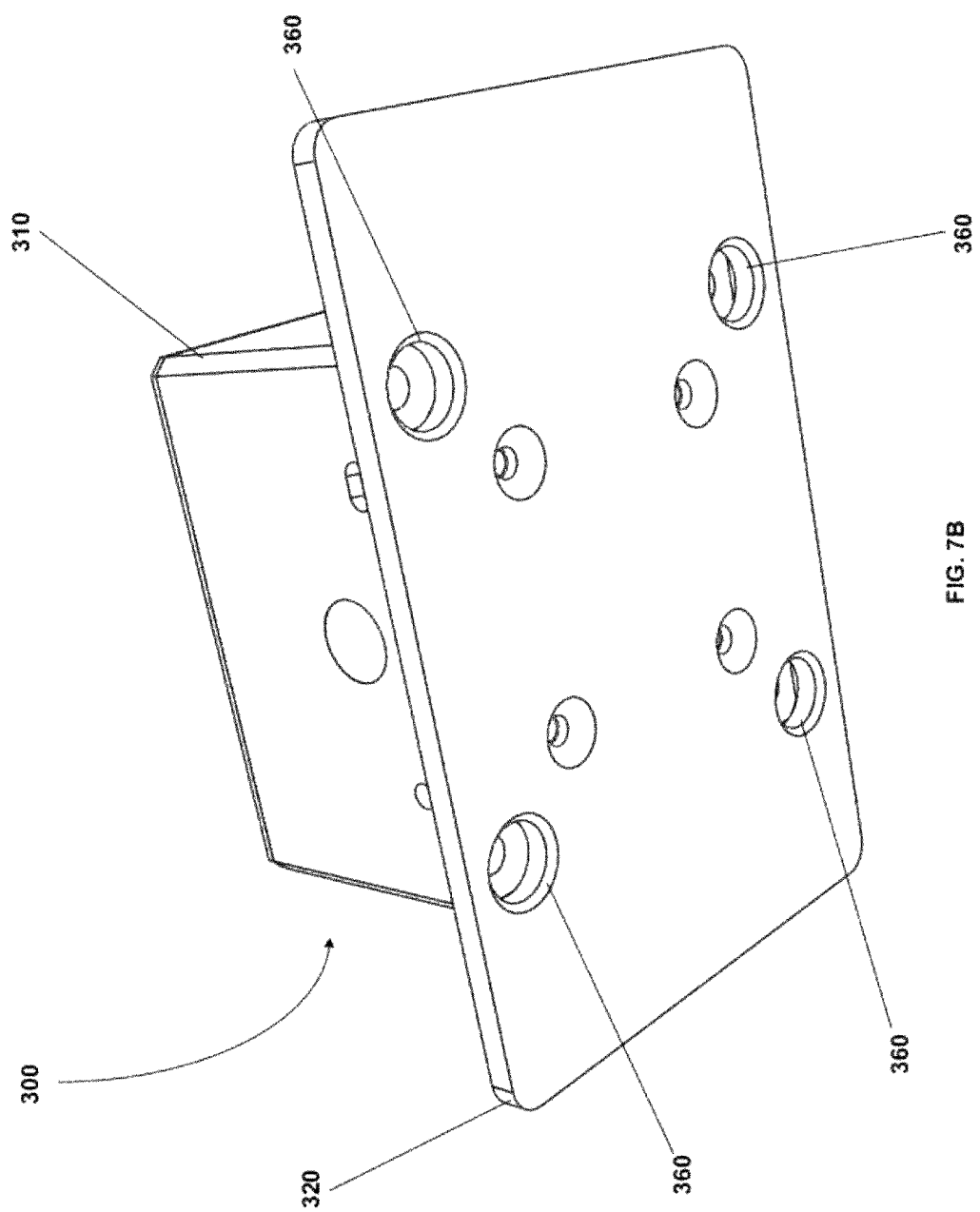

FIGS. 7A-7C show the assembly of the robot teach tool 300 with a parking station 700 according to one embodiment of the present disclosure. As used herein, a parking station is a fixture that mates with teach tool 300 such that the teach tool can be precisely and repeatably placed on and picked up from the parking station. As shown in FIG. 7A, parking station 700 comprises parking station posts 710 that are configured to accommodate parking station holes 360 when foot assembly 320 is placed on the parking station. In one embodiment, parking station 700 and parking station posts 710 are made of aluminum, however, other material such as metal or rigid plastic. When coupled together, parking station posts 710 extend up loosely through parking station holes 360 into body assembly 310 so that teach tool 300 can be easily separated therefrom. Note that in one embodiment as shown in FIG. 7A-7C, parking station holes 360 are generally of a diameter that ranges from about 0.1 inches to about 0.3 inches to accommodate parking stations that may be used to interact with different size shaped workpiece receptacles that may be utilized by the various instruments located at the workstations in the robotic workcell. FIG. 7B shows a perspective bottom view of robot teach tool 300 before resting on parking station posts 710 of parking station 700. In particular, FIG. 7B provides a more detailed view of parking station holes 360 that couple with parking station posts 710. FIG. 7C show robot teach tool 300 coupled to parking station 700 via parking station posts 710 and parking station holes 360. Upon assembly, robot teach tool 300 rests on parking station 700.

FIG. 8 shows a schematic diagram of robot end effector 130 holding the robot teach tool 300 after removal from the parking station 700 according to one embodiment of the present disclosure. As shown in FIG. 8, grippers 135 of the robot end effector 130 use registration features 330 on body assembly 310 of robot teach tool 300 as a location guide of where to grip the teach tool 300. Essentially, robot teach tool 300 is designed to be releasably mated with the grippers 135 of end effector 130 in a repeatable position. Once mated by grippers 135, robot teach tool 300 occupies substantially the same space as the workpiece or object (e.g., microtiter plates) that end effector 130 would carry during normal operation.

FIG. 9 shows a schematic diagram of a robot end effector 130 using grippers 135 to place robot teach tool 300 on a workpiece receptacle 900 associated with one of the drug discovery instruments 910 located at a workstation within a robotic workcell according to one embodiment of the present disclosure. When robot teach tool 300 is placed in workpiece receptacle 900, the robot controller receives the data from the teach tool and automatically learns the pick and place positions associated with that workpiece receptacle. These pick and place positions are stored and used in the future by the robot controller to direct the robot to pick and place microtiter plates to and from instrument 910.

In operation, robot end effector 130 via grippers 135 grips teach tool 300 at body assembly 310 such that foot assembly 320 hangs loosely from the gripped part and is supported by the bearings inside the teach tool body. Foot assembly 320 is designed to interface with the horizontal surface of workpiece receptacle and with the vertical surfaces of the nest. In addition, foot assembly 320 is designed to return repeatably into a central position with respect to the gripped part of robot teach tool 300 after moving through six degrees of freedom and three degrees of rotation. Proximity sensor 400 (FIG. 4) in body assembly 310 detects when foot assembly 320 is perturbed from its central, resting position and transmits that information to the robot controller through well known approaches such as a wireless communication or a wired connection.

In order to teach a point for the first time, the robot is directed to pick up the teach tool in end effector 130 via grippers 135. The robot operator then uses a teach pendant to manually guide the grasped robot teach tool 300 roughly above workpiece receptacle 900 to be taught. The robot controller, which controls operation of the robot and is described below in more detail, contains a software application that is run to direct the movement of the robot teach tool 300 by end effector 135 downward into workpiece receptacle 900 until foot assembly 320 is perturbed from its central position by the horizontal surface of workpiece receptacle 900 and proximity sensor 400 (FIG. 4) detects the "collision". The robot controller receives the perturbation signals from proximity sensor via wired connection or a wireless transmitter in the teach tool and then directs robot end effector 135 to move the robot teach tool 300 upward again until foot assembly 320 has returned to its central position and the proximity sensor no longer detects the collision. A robot orienter, which is also described below in more detail, is an algorithm utilized by the robot controller that records the position of the robot when the proximity sensor 400 (FIG. 4) no longer detects the collision. The robot controller then directs robot end effector 135 to move robot teach tool 300 in the five remaining degrees of freedom and three degrees of rotation. Each time foot assembly 320 collides with the bottom horizontal surface of workpiece receptacle 900 or the vertical walls, the robot orienter records where the collisions occur. The robot orienter then uses these points to determine the precise orientation of workpiece receptacle 900 with respect to the robot. The pick/place point is thus taught. To teach the next point, the robot operator uses the teach pendant to manually guide the teach tool above the next workpiece receptacle in the workcell and the above-described process is repeated. Upon training, the points or coordinates are subsequently used by the robot controller to direct the robot end effector to pick/place the microtiter plates to the various instruments in the robotic workcell.

Figure 10A:
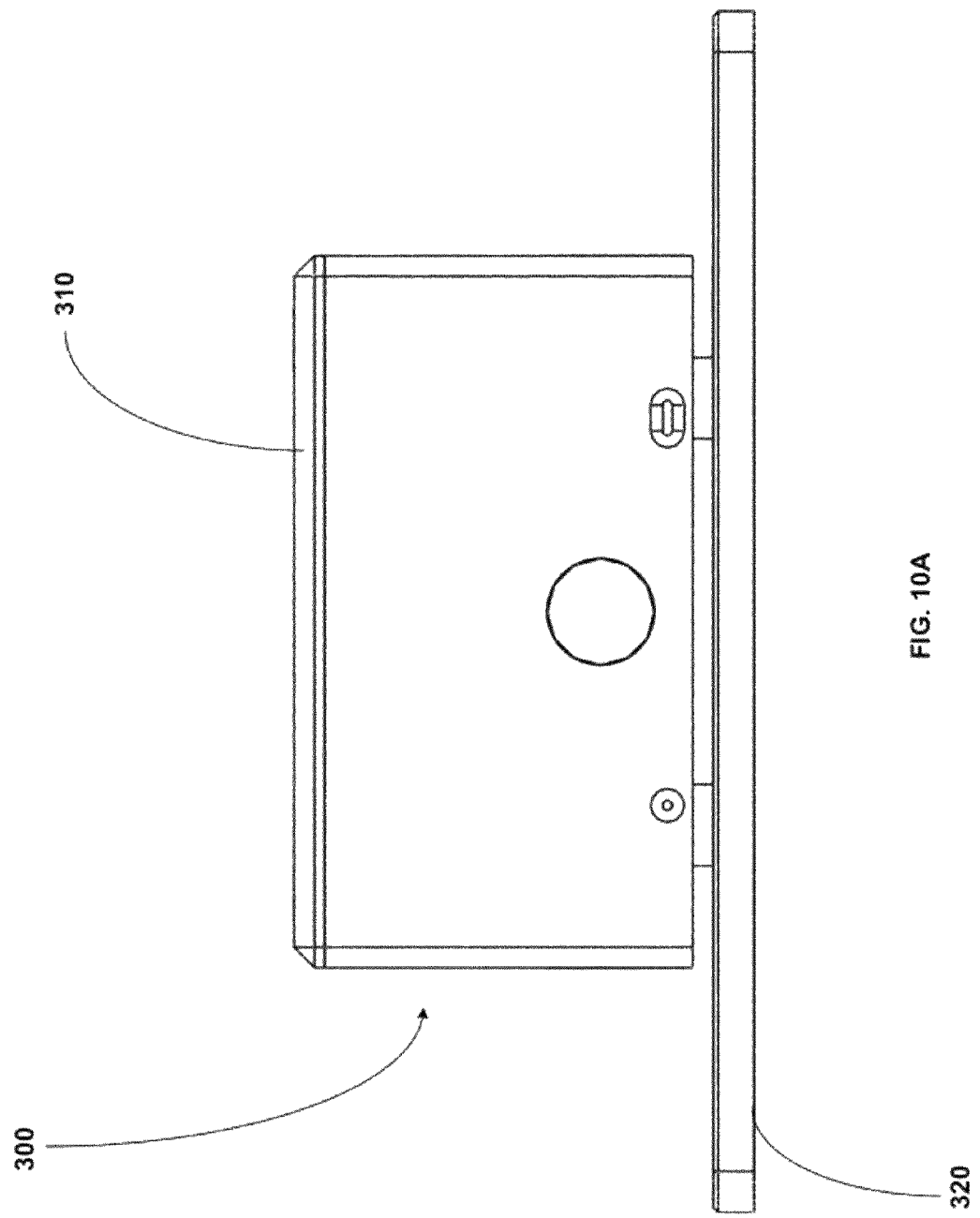
FIGS. 10A-10F show an overview of the various types of perturbations that the robot teach tool can be used to detect in the teaching of a robot according to one embodiment of the present disclosure.
Figure 10B:
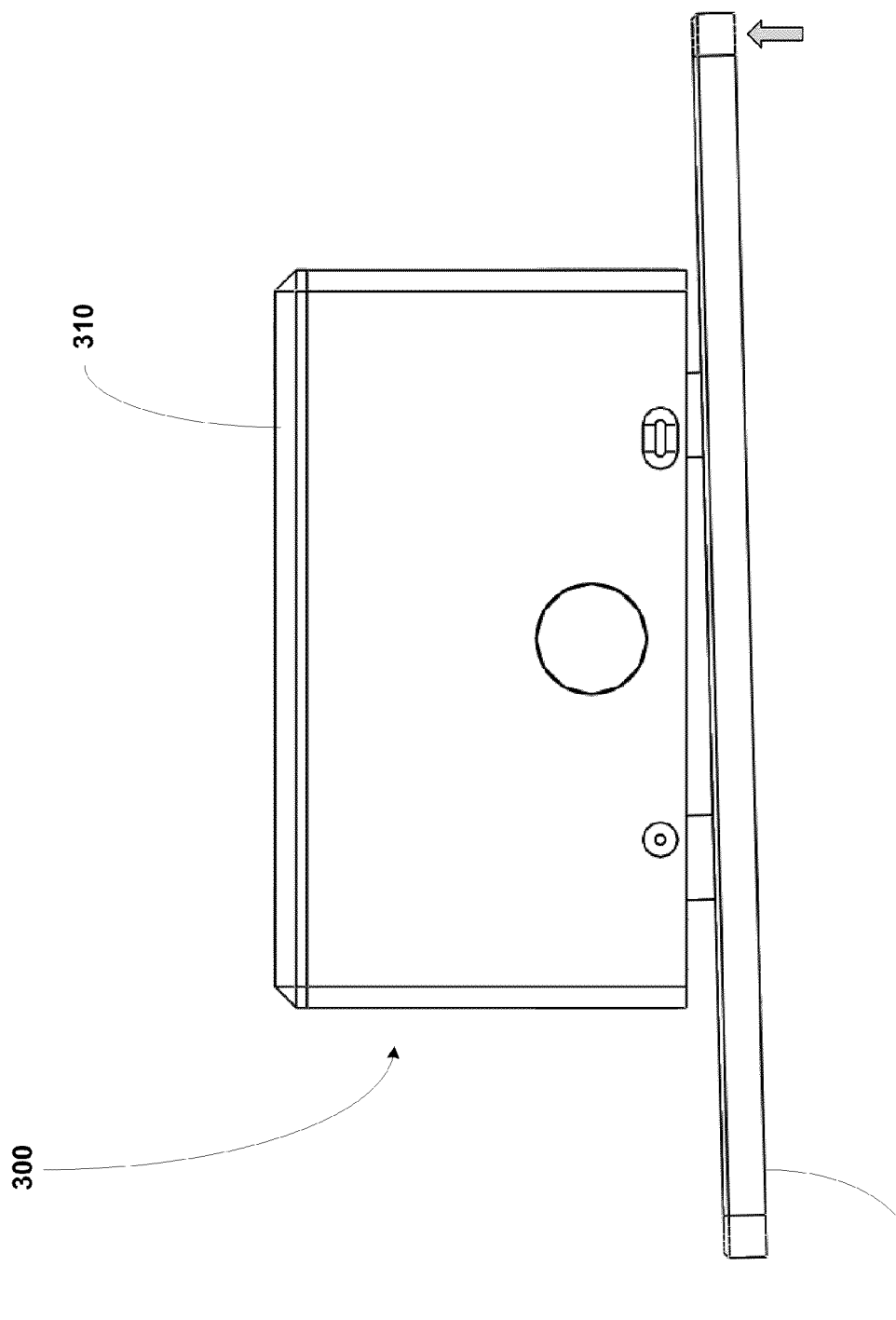
Figure 10C:
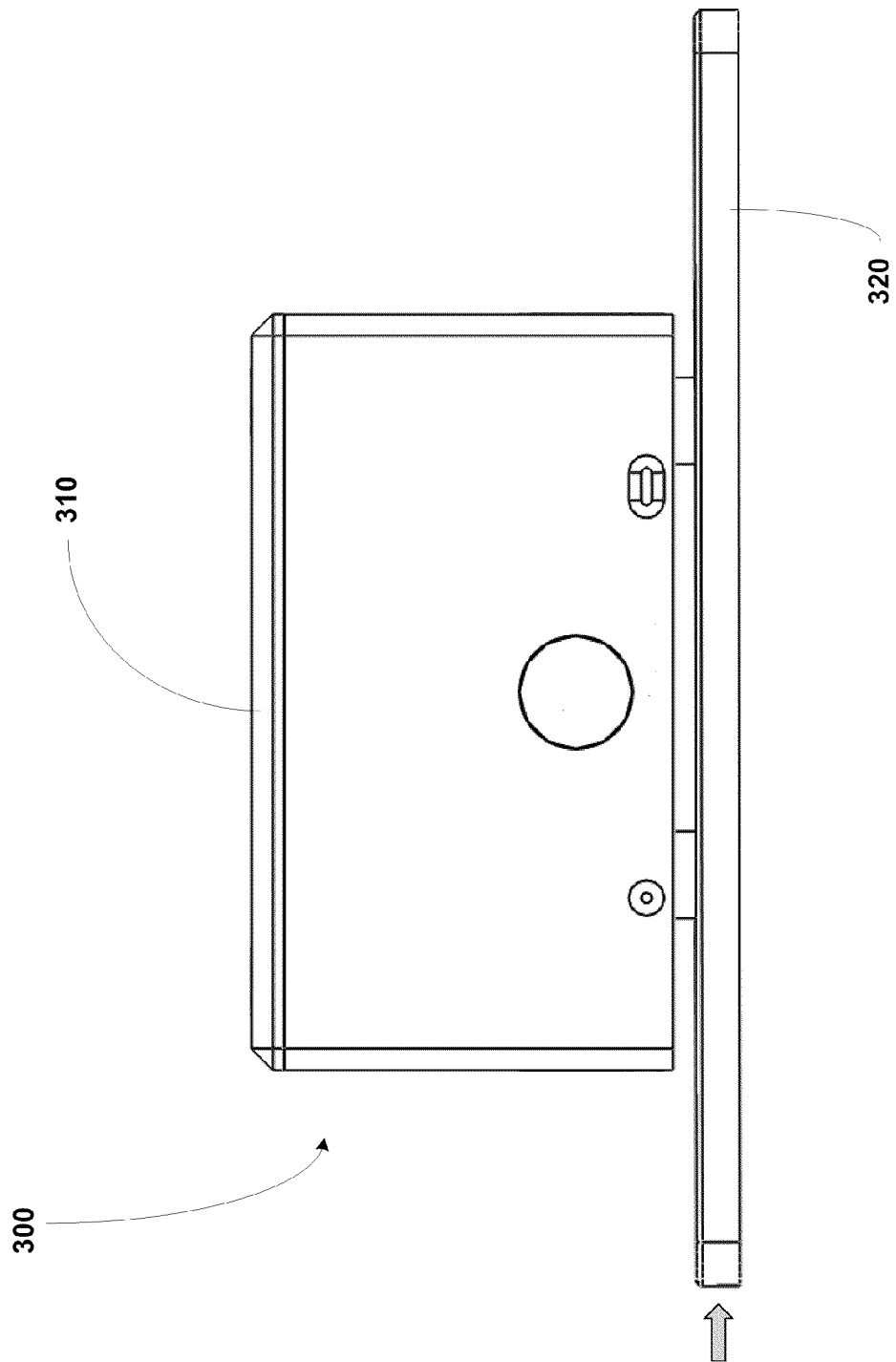
Figure 10D:
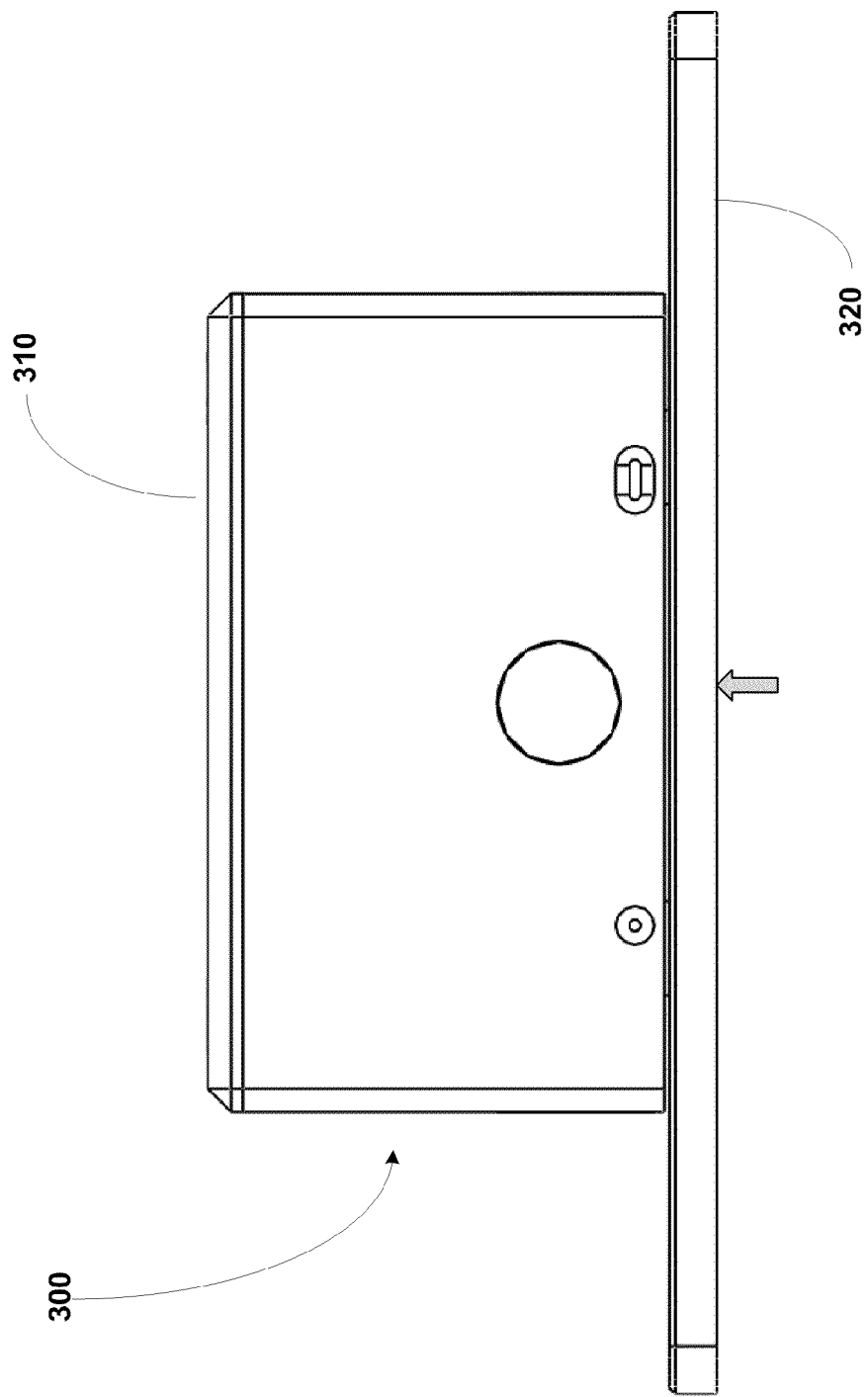
Figure 10E:
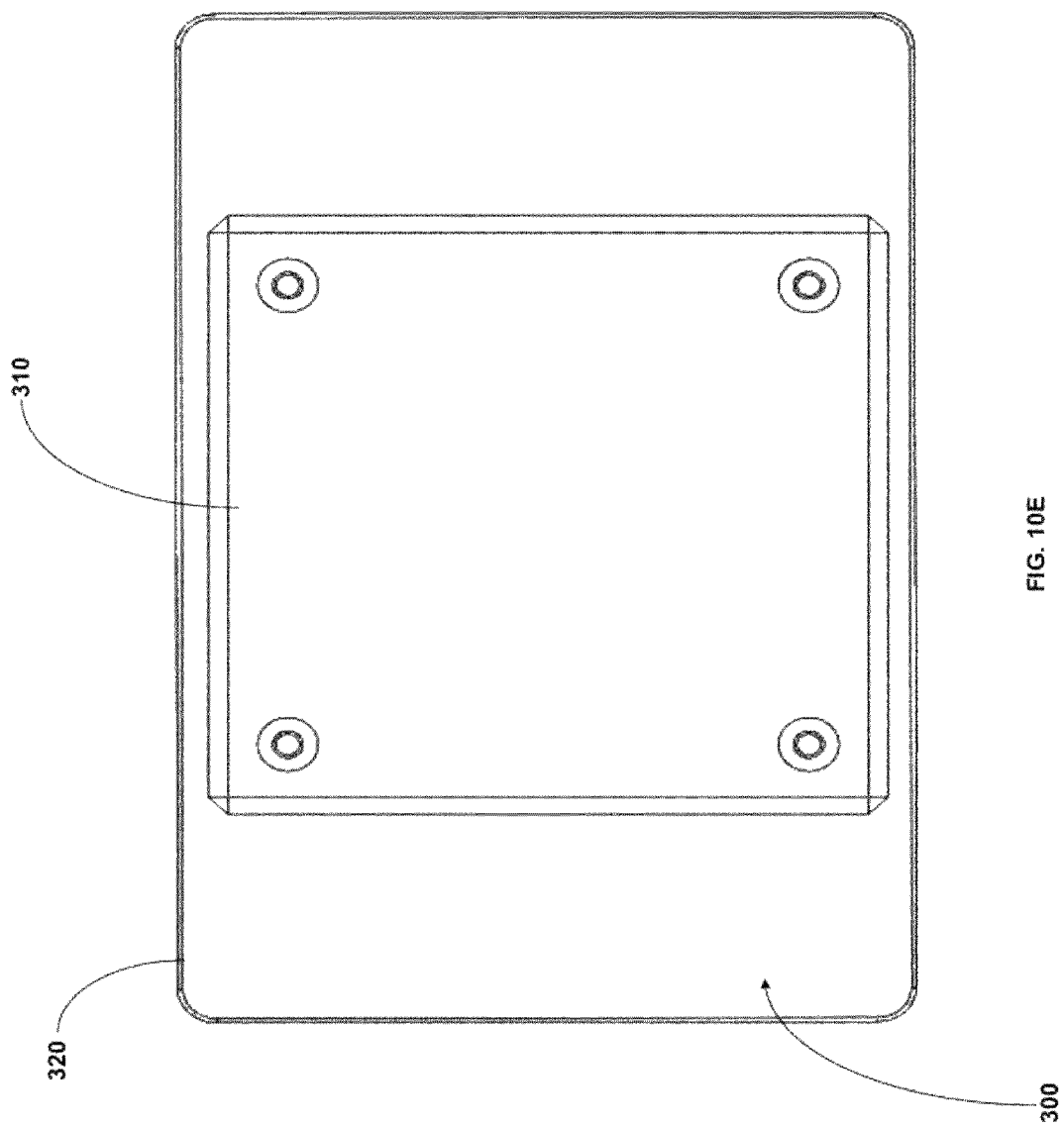
Figure 10F:
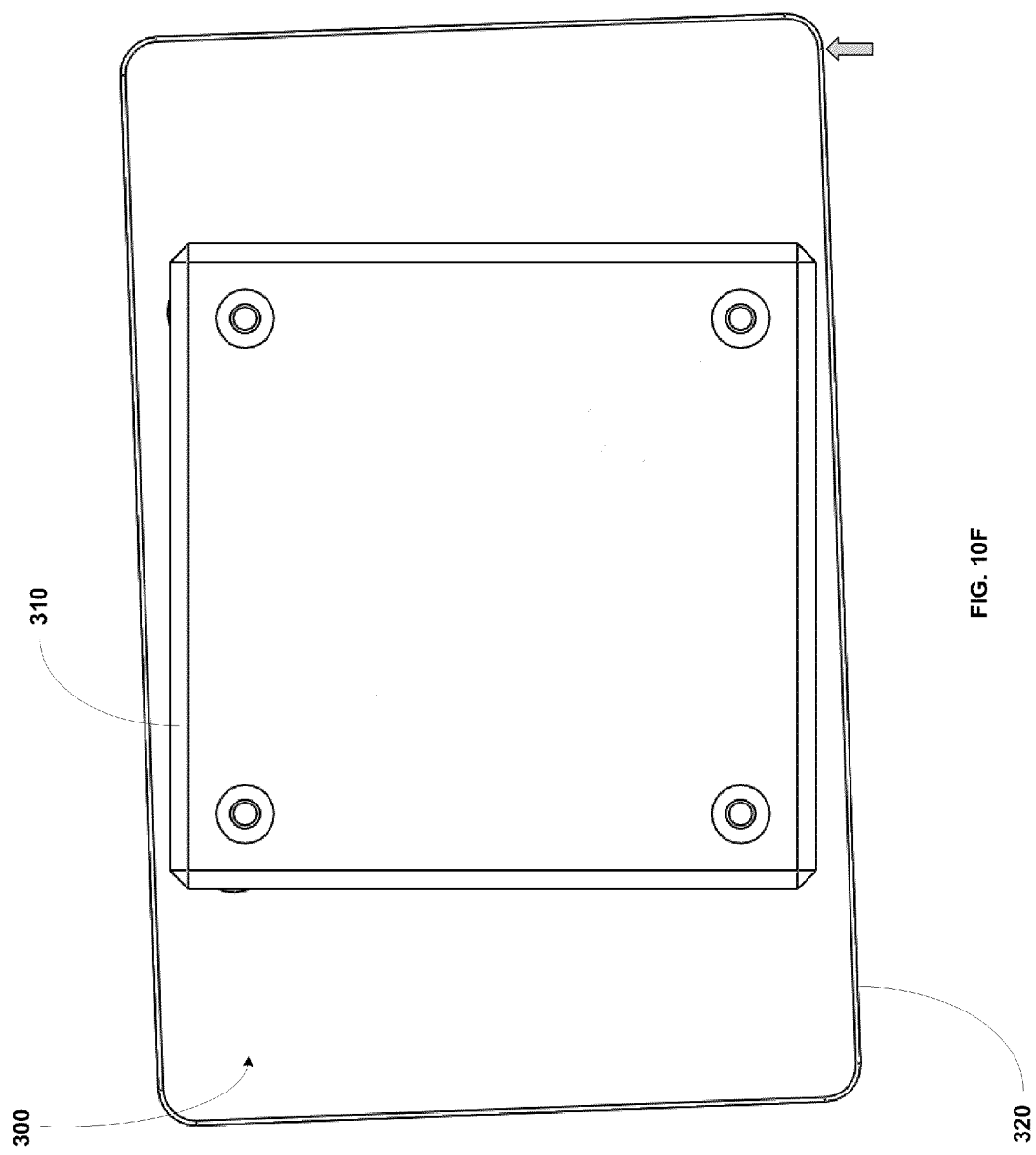

FIGS. 10A-10F show an overview of the various types of perturbations that the robot teach tool 300 can encounter and detect in the teaching of a robot according to one embodiment of the present disclosure. These perturbations are illustrative of some of the perturbations that can occur as the robot controller directs the robot end effector 130 to move the robot teach tool 300 from a central position within a workpiece receptacle through six degrees of freedom. In particular, FIG. 10A shows foot assembly 320 of robot teach tool 300 in a centered position as it would be placed within a workpiece receptacle by the end effector. FIG. 10B shows foot assembly 320 being rotated vertically at one end as robot teach tool 300 would be moved within a workpiece receptacle by end effector as it is moved through six degrees of freedom. FIG. 10C shows foot assembly 320 being translated horizontally at one end as robot teach tool 300 would be moved within a workpiece receptacle by the end effector. FIG. 10D shows foot assembly 320 being translated vertically at a centered position as robot teach tool 300 would be moved within a workpiece receptacle by the end effector. FIG. 10E shows a top-down view of body assembly 310 and foot assembly 320 in a centered position as robot teach tool 300 would be placed within a workpiece receptacle by the end effector. FIG. 10F also shows a top-down view of robot teach tool 300 as foot assembly 320 is rotated horizontally at one end as the teach tool is moved within a workpiece receptacle through six degrees of freedom. In addition to the illustrative perturbations shown in FIGS. 10A-10F, the robot controller directs the robot end effector 130 to move robot teach tool 300 through three degrees of rotation (i.e., pitch, roll and yaw) within the workpiece receptacle.

Figure 11A:
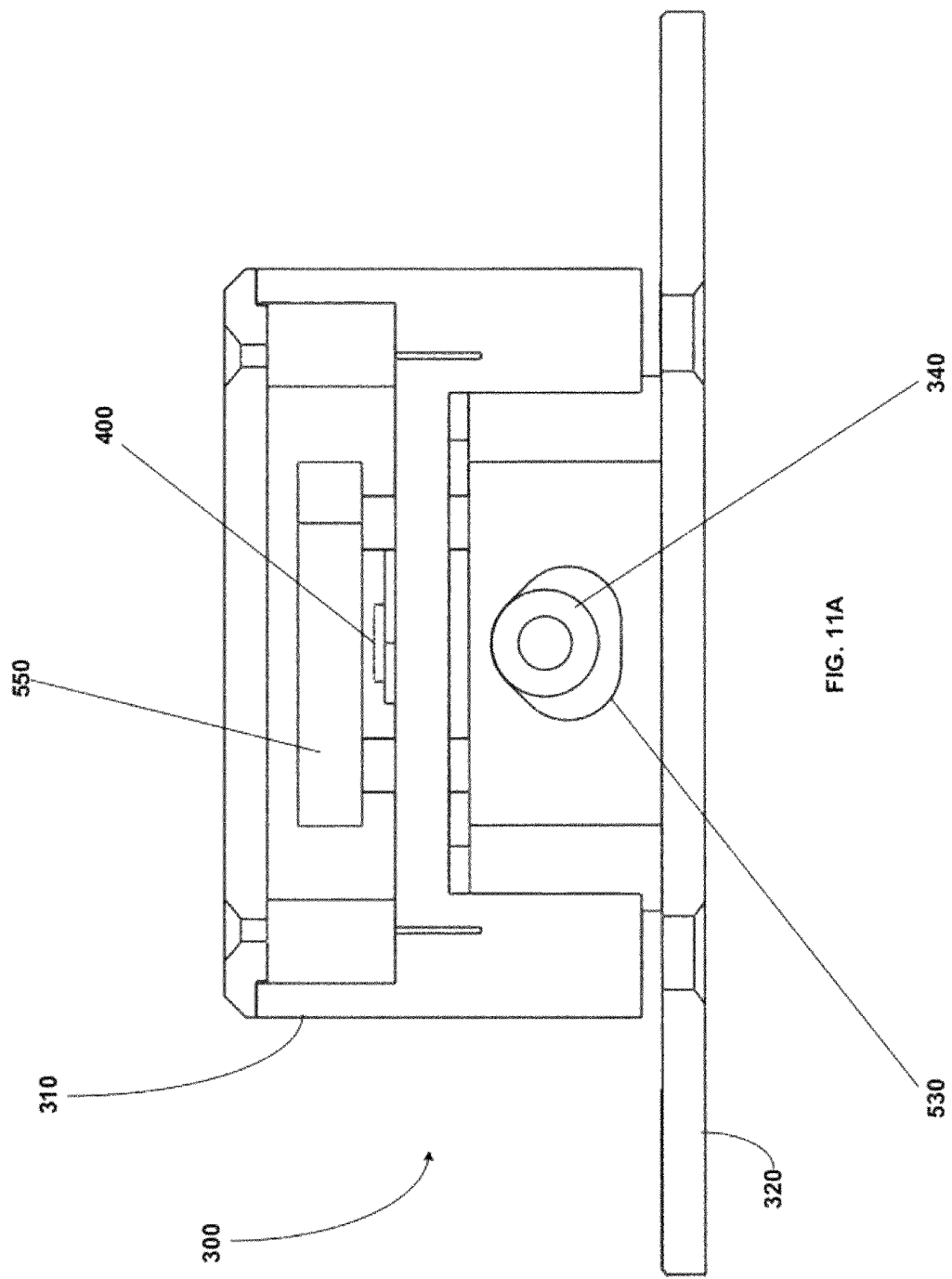
FIGS. 11A-11B show cutaway views of the robot teach tool in a central unperturbed position and a perturbed position, respectively, according to one embodiment of the present disclosure.
Figure 11B:
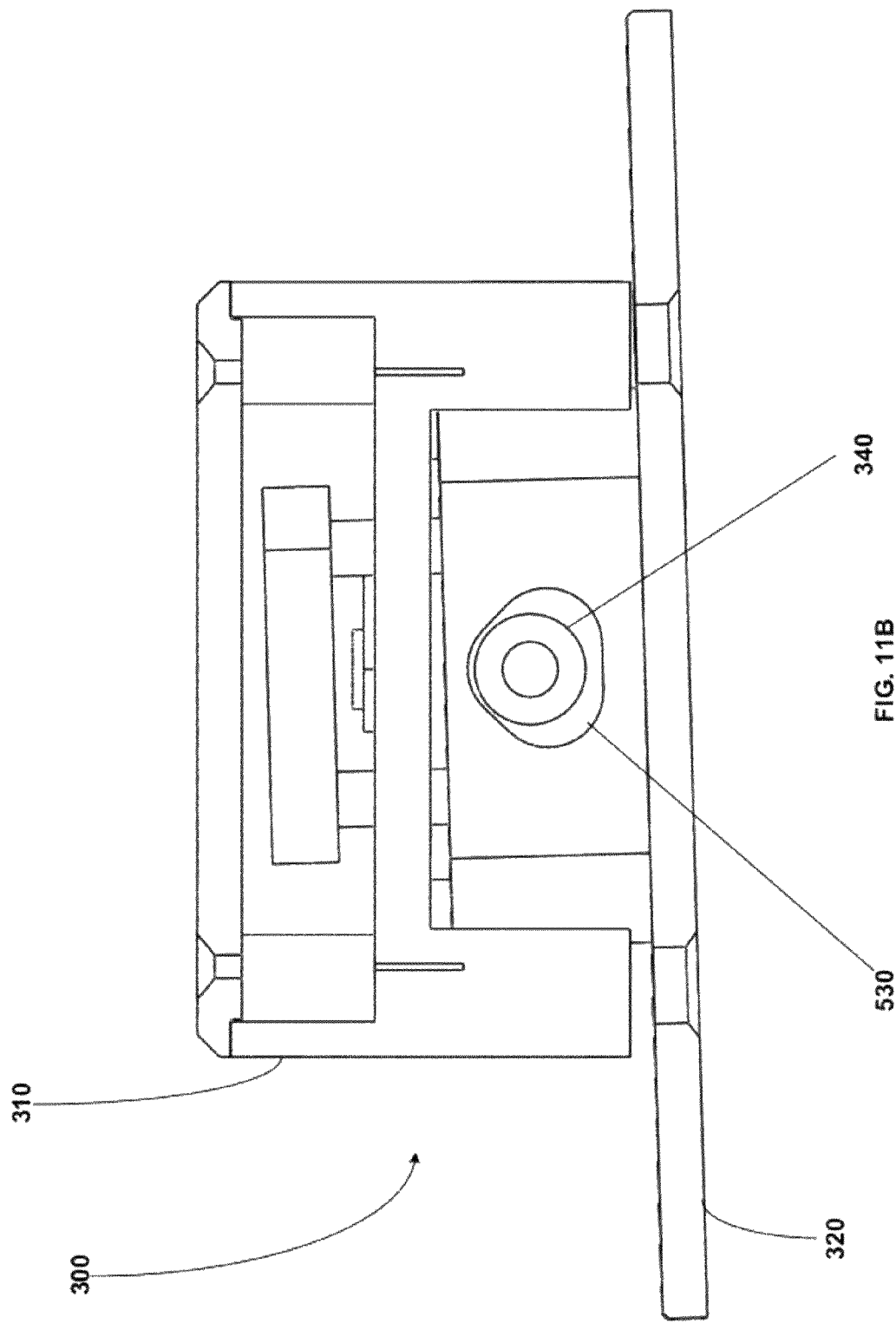

FIGS. 11A-11B show cutaway views of robot teach tool 300 as it would be moved within a workpiece receptacle by the end effector from a central unperturbed position to one perturbed position during the teaching of a robot. In particular, FIGS. 11A-11B illustrate one embodiment in how robot teach tool 300 detects a perturbation with the workpiece receptacle as the teach tool moves through six degrees of freedom and through three degrees of rotation. In FIG. 11A, robot teach tool 300 is in a centered position that is indicative of a non-perturbation state. In this position, proximity sensor 400 senses that sensor target 550 is in its central position. In FIG. 11B, foot assembly 320 has been perturbed presumably by some upward force on the right side of the assembly. Note that bearing pocket 530 has been lifted off of bearing 340, which causes sensor target 550 to lift up and away from proximity sensor 400. From these actions, proximity sensor 400 senses that foot assembly 320 has been perturbed away from its central position. Proximity sensor 400 generates a signal representative of this perturbation to the robot controller which uses the robot orienter to note all of the perturbations that occur as end effector 130 moves robot teach tool 300 through six degrees of rotation and three degrees of rotation. In addition, the robot orienter determines precise orientation of the pick/place points from these perturbations. As mentioned above, these taught pick/place points are used by the robot controller in one embodiment to place and remove microtiter plates from the workpiece receptacles in the robotic workcell during drug discovery process operations.

Figure 12:
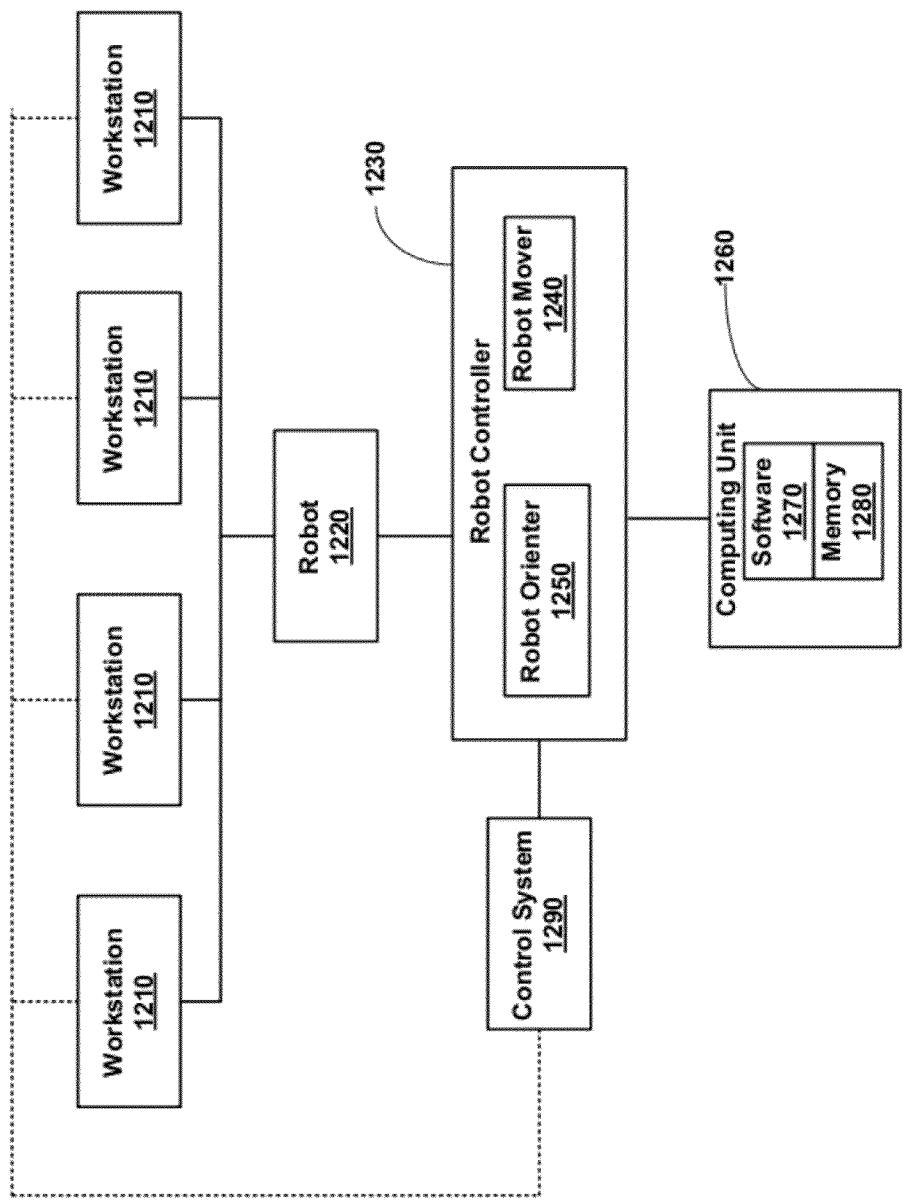
FIG. 12 is a schematic block diagram illustrating a robotic workcell including associated control hardware and software in which the robot teach tool of the present disclosure can be used to automatically teach pick and place points.

FIG. 12 is schematic block diagram illustrating a robotic workcell including associated control hardware and software in which the robot teach tool of this disclosure can be used to automatically teach pick and place points. As shown in FIG. 12, there are a plurality of workstations 1210 that robot 1220 is configured to perform various operations which all depend on the particular environment in which the robot is being used. A robot controller 1230 is coupled to robot 1220 through a wired connection or a wireless connection. As shown in FIG. 12, robot controller 1230 comprises a robot mover 1240 that directs robot 1220 to make specified movements that are in accordance with the operations to be performed by the robot at the various workstations 1210. In one embodiment, where the robot teach tool of the present disclosure is used to automatically teach pick up and place positions to robot 1220, robot mover 1240 directs the robot to pick up the robot teach tool with its end effector. Control of the picking up and placement of the robot teach tool is provided from a robot operator that uses a teach pendant to manually guide the grasped robot teach tool 300 to a location above a workpiece receptacle of an instrument located at a workstation 1210. Robot mover 1240 directs the movement of the robot teach tool downward into the workpiece receptacle until the foot assembly of the robot teach tool is perturbed from its central position by the horizontal surface of workpiece receptacle and the proximity sensor within the teach tool detects the collision. Robot mover 1240 then directs the end effector of robot 1220 to move the robot teach tool upward again until the foot assembly has returned to its central position and the proximity sensor no longer detects the collision.

Robot controller 1230 further comprises a robot orienter 1250, which records the position of robot 1220 when the proximity sensor no longer detects the collision, which is considered a taught position. Robot mover 1240 then directs robot 1220 to move the robot teach tool in the five remaining degrees of freedom and three degrees of rotation. Each time the foot assembly collides with the bottom horizontal surface of the workpiece receptacle or the vertical walls, robot orienter 1250 records where the collisions occur. While robot mover 1240 moves the teach tool, robot orienter 1250 is using the various taught points to determine the precise orientation of the workpiece receptacle with respect to robot 1220.

In one embodiment, the precise orientation of the workpiece receptacle with respect to robot 1220 is determined in the following manner. First, after a point has been roughly taught, robot 1220 is moved about 10 millimeters above the roughly taught point. The robot 1220 is then moved down in 1 millimeter increments. When the proximity sensor in the teach tool engages, the robot 1220 moves back in 0.1 millimeter increments until it disengages to find out a value for the X direction. Afterwards, the robot 1220 moves the teach tool in the positive and negative RY and RZ directions in approximately 0.2 degree increments until the proximity sensor engages and then back in smaller increments until the sensor disengages. The robot orienter 1250 then calculates the median for the movements in the RZ and RY directions. Next, the robot 1220 moves the teach tool in the positive and negative Z and Y directions so that the robot orienter 1250 can find out the Z and Y limits. Then the robot orienter 1250 calculates the median for the movements in the Z and Y directions. The robot then rotates the teach tool in the positive and negative RX directions to find out the RX limits. The robot orienter 1250 can then calculate the median for the RX direction. Afterwards, the robot orienter 1250 then re-checks the vertical X limit. The robot orienter 1250 then saves the taught point.

The pick up/place point is thus considered taught once the precision orientation is determined. To teach the next point, the robot operator uses the teach pendant to manually guide the teach tool above the next workpiece receptacle in the workstation 1210 and the above-described process associated with robot mover 1240 and robot orienter 1250 is repeated. Upon completion of the teaching, the points or coordinates are stored and subsequently used by the robot mover 1240 to direct the robot end effector to pick up and place plates to be used in conjunction with workstations 1210.

Note that once a point is taught with the robot teach tool of the present disclosure, it can be taught again without requiring a robot operator to manually guide the tool to the point. Since the point has already been taught, the robot can guide the robot teach tool above the point even if the point has shifted slightly since the first step requires that the tool start only roughly above the workpiece receptacle. This means that over time, should taught points drift due to shifting of the floor underneath, collisions with various parts of the robotic workcell by external accidents, or robot crashes, that the entire workcell can be automatically retaught with no operator intervention whatsoever. For example, shifts can occur overnight when the robotic workcell is not being used.

FIG. 12 only shows the components of the robot controller 1230 that facilitate a general understanding of the approach used to automatically teach pick-up and place points with the robot teach tool of the present disclosure. Those skilled in the art will recognize that robot controller 1230 can have additional components not shown in FIG. 12. For example, the controller 130 may have components to monitor sensors that may be placed near workstations 1210 to monitor the operations performed by robot 1220.

Robot controller 1230 can take the form of an entirely hardware embodiment, an entirely software embodiment or an embodiment containing both hardware and software elements. In a preferred embodiment, the functions performed by the robot controller 1230 to facilitate any one of the above-mentioned operations associated with using the robot teach tool of this disclosure may be implemented in software, which includes but is not limited to firmware, resident software, microcode, etc.

Furthermore, the processing functions performed by robot controller 1230 to facilitate any one of the above-mentioned operations can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the computer, instruction execution system, apparatus, or device. The computer readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Referring back to FIG. 12, robotic workcell 1200 further comprises computing unit 1260 having software 1270 and memory 1280 describing a plurality of programmed operations to be performed and related data which causes robot 1220 via robot controller 1230 to move in prescribed movements to perform the various operations assigned to each workstation 1210. A control system 1290, coupled to workstations 1210, computing unit 1260 and robot controller 1230, provides a communication and operating supplies (electricity, pneumatic, vacuum, etc.) link therebetween. Those skilled in the art will recognize that additional hardware (e.g., sensors, drives, etc.) not discussed herein may be found in the robotic workcell 1200.

Note that some instruments' workpiece receptacles are designed such that the nest does not directly accommodate teaching with the robot teach tool 300 as described heretofore. For example, a workpiece receptacle may have a large hole in the center of the horizontal bottom surface that allows the foot assembly 320 to slip through without registering a collision with the workpiece receptacle during teaching. In other cases, there may be too few vertical surfaces at the perimeter of the workpiece receptacle, which would allow the robot teach tool 300 to be twisted or moved horizontally without registering a collision with the nest at the proper position during teaching. In these cases, a specially designed auxiliary workpiece receptacle can be inserted into the instrument workpiece receptacle. In this embodiment, the auxiliary workpiece receptacle would have the footprint of a standard Society of Biomolecular Screening (SBC) specified microtiter plate, plus a large rectangular pocket in the top surface that accommodates the robot teach tool 300.

In one embodiment, the power and data wiring associated with the robot teach tool 300 is manually connected to the robot whenever the teach tool is grasped by the robot end effector 130, and manually disconnected from the teach tool whenever the tool is released by the end effector. As a result, in this embodiment, the robotic workcell cannot be taught in an unsupervised fashion and thus needs to be taught in a supervised fashion. The first reason for supervised teaching in this embodiment is that the robot teach tool 300 may need to be grasped in one of two horizontal orientations, commonly referred to in the industry as landscape and portrait. Most robotic workcells are comprised of some instruments that require picking/placing in landscape and others that require picking/placing in portrait. Therefore, at least once during the teaching process in this embodiment, the robot teach tool 300 held in the end effector 130 in one orientation would have to be released in a set down position and regrasped in the other orientation. During this process, any wiring from the robot forearm to the teach tool is likely to become tangled and prevent proper regrasping of the teach tool. The second reason for supervised teaching is that it may be desired for the robotic workcell to pick/place microtiter plates and then perform self-teaching (or vice-versa) without manual intervention to connect or disconnect the teach tool wiring in between the two exercises.

Several approaches can be used to solve the above-noted issue. In one embodiment, a robot teach tool changer is used which allows the robot to pick up, set down, and electrically and pneumatically connect and disconnect different end effectors. As used herein, the robot teach tool changer allows a robot to quickly and automatically change its end-effector, or end-of-arm tooling. In this embodiment, one end effector could be a microtiter plate gripper and have a different end effector. The robot teach tool can then either be picked up in either landscape or portrait orientation, or have its orientation changed automatically without being set down and regripped.

In another embodiment, the microtiter plate gripper of the robot can be designed to automatically connect power and data lines to the robot teach tool as it grips the teach tool and to automatically disconnect power and data lines from the teach tool as the gripper releases the teach tool. In this embodiment, connectors to accomplish this function reside in both the end effector and the teach tool itself. In particular, there could be two such connectors in the robot teach tool, so that the connection can be made when the teach tool is gripped in either landscape or portrait orientation. Alternatively, the robot teach tool could automatically change orientations without being set down and regripped.

In still another embodiment, the robot teach tool is designed to avoid the need for a wiring connection altogether during teaching. In this embodiment, the robot teach tool contains a battery that powers the proximity sensor, as well as a wireless transmitter that transmit the sensor state to a receiver, located somewhere in the robotic workcell that is wired to the robot controller running the teach control software. In another embodiment, a rechargeable battery is used to recharge whenever the robot teach tool is set down on a specially designed charging station.

Although the description heretofore has been with respect to using the robot teach tool with a robotic workcell, the teach tool may be used in a modular robotic system. FIGS. 13-16 show schematic diagrams of a modular robotic system 1400 in which the robot teach tool of this disclosure can be used to automatically teach pick and place points.

Figure 13:
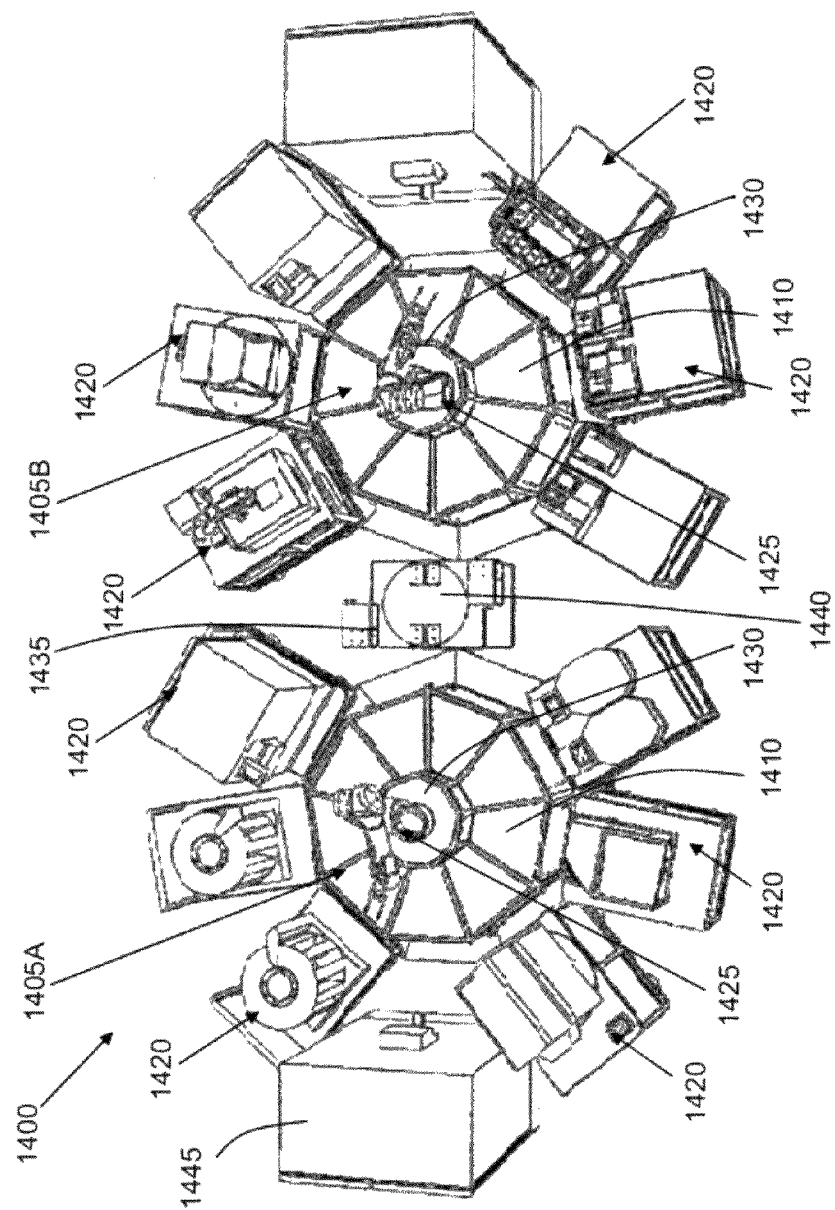
FIG. 13 is a schematic diagram of a modular robotic system in which the robot teach tool of the present disclosure can be used to automatically teach pick and place points.
Figure 14:
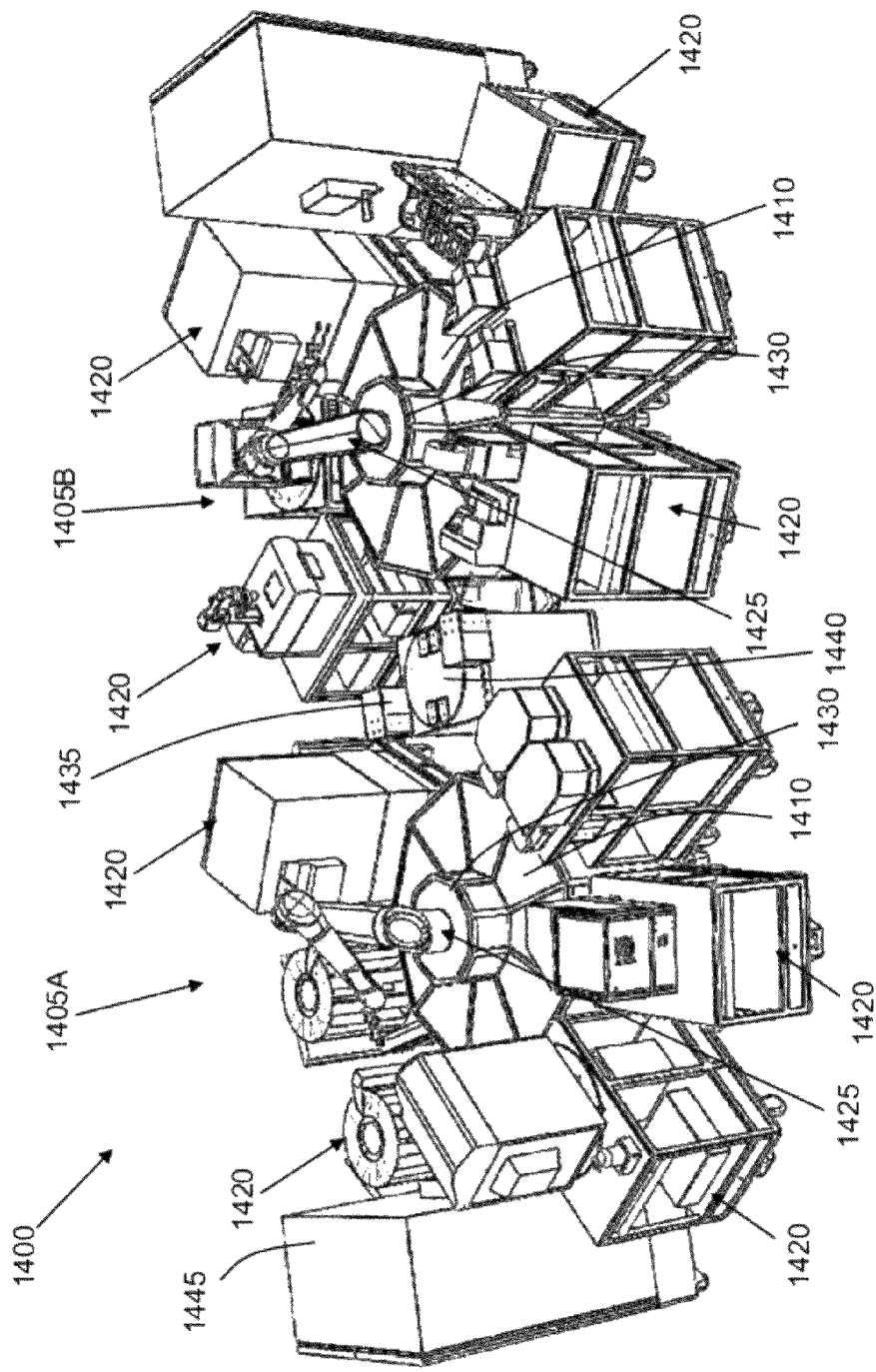
FIG. 14 is a top perspective view of the system depicted in FIG. 13.
Figure 15:
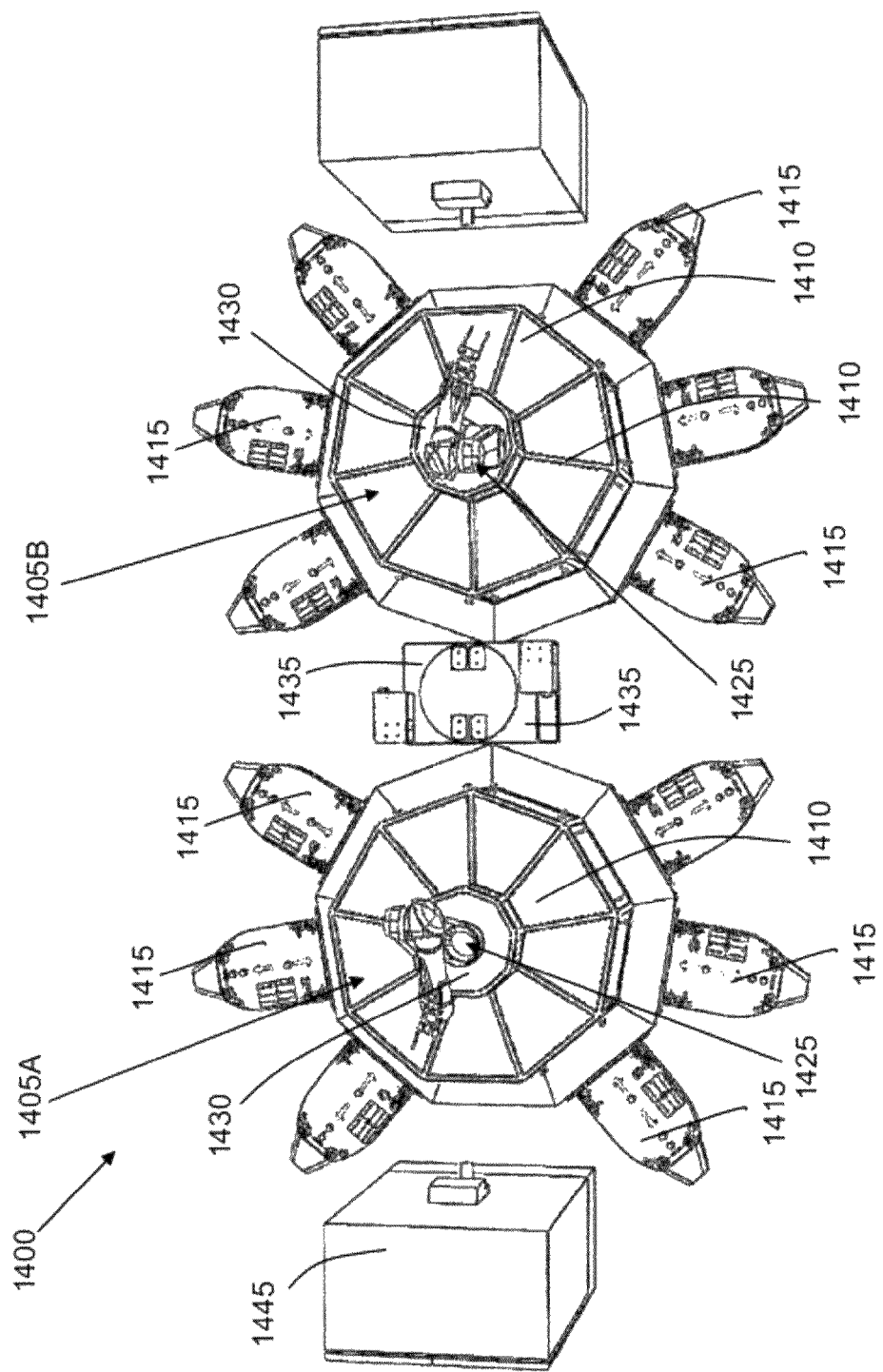
FIG. 15 is a top view of the system depicted in FIG. 14, but without equipment.
Figure 16:
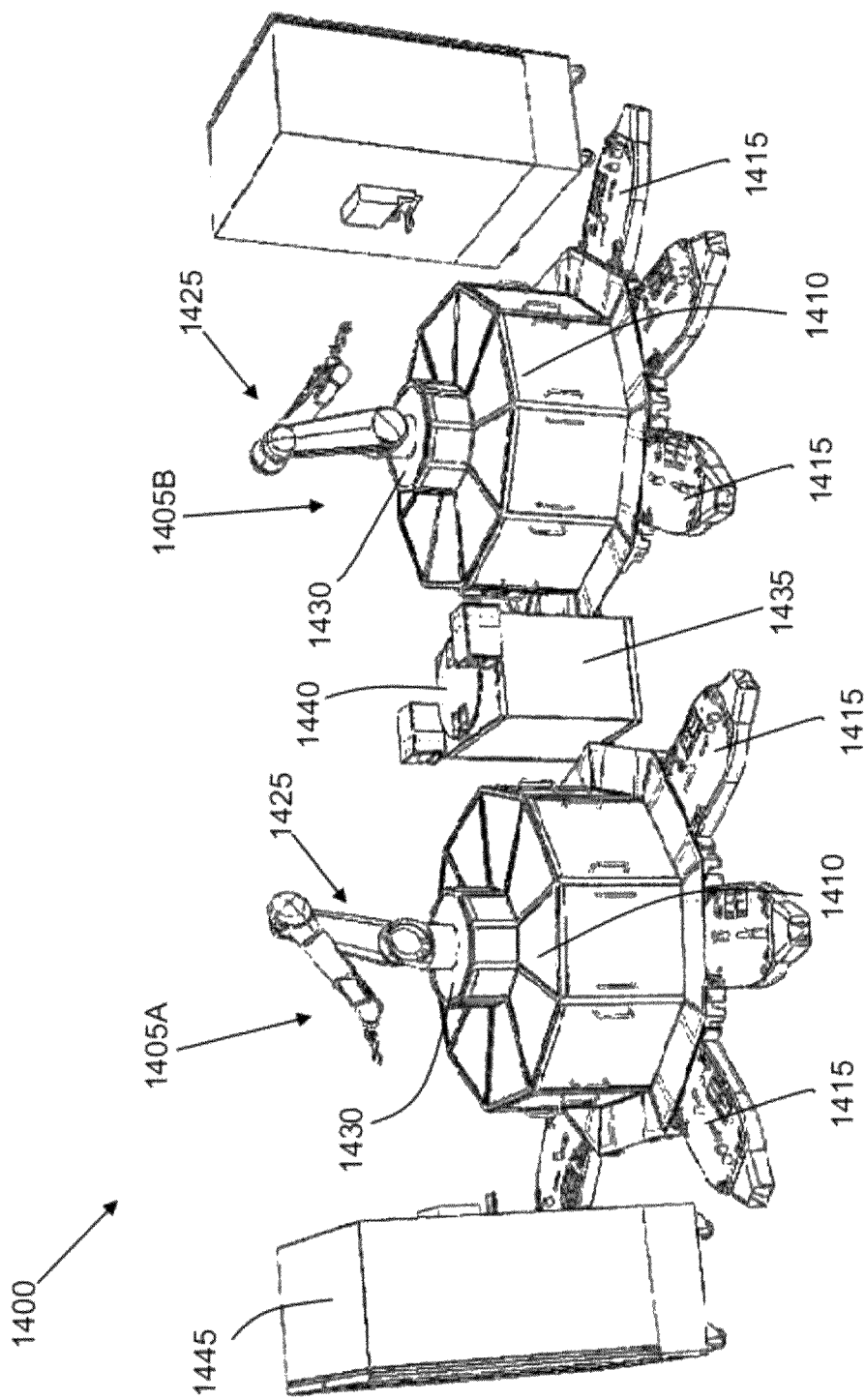
FIG. 16 is a side perspective view of the system depicted in FIG. 14.

As shown in FIGS. 13-16, modular robotic system 1400 comprises at least one unit 1405A, 1405B (two shown) that form a basic element of the arrangement. Each unit 1405A, 1405B includes a polygonal base 1410 having a plurality of sides, a number of the plurality of sides including a docking station 1415 (FIGS. 15-16) for mating with a mobile equipment carrying cart 1420 (FIGS. 13-14). In addition, each unit 1405A, 1405B includes a multi-axis robotic arm 1425 having a stationary base 1430 positioned on or in polygonal base 1410 and configured to interact with the equipment on each mobile equipment carrying cart 1420 (FIGS. 13-14). Each of the sides face outwardly from stationary robotic arm 1425.

In operation, each docking station 1415 in modular robotic system 1400 is adapted to matingly receive a corresponding mobile equipment carrying cart 1420. As a result, various types of laboratory devices that are mounted on mobile equipment carrying cart 1420 can be readily integrated into modular robotic system 1400.

In one embodiment, at least a pair of units 1405A, 1405B are positioned adjacent to one another, each pair including an interface station 1435 therebetween for allowing passing of material between the units. Interface or bridge station 1435 may include any structure necessary to properly position material for movement between units 1405A, 1405B and maintain the material in a desired state, e.g., a flat surface, material holder, heating or cooling chamber, etc. In one embodiment, interface station 1435 may include a turntable 1440 for turning material to face in an appropriate direction. It should be noted that, by providing polygonal bases 1410, any number of units 1405 may be provided sequentially such that the number of laboratory devices that can be integrated into modular robotic system 1400 is maximized, thereby rendering the system compact in size but highly functional in its capabilities, which is highly desirable.

In one embodiment, each polygonal base 1410 includes at least six sides and in another embodiment may include at least nine sides (shown), however, they may include practically any number. Modular robotic system 1400, as described herein, may also include a robot controller 1445 that controls operation of each unit 1405. U.S. patent application Ser. No. 12/412,706 provides a more detailed description of one example of a modular robotic system.

Using the robot teach tool 300 in modular robotic system 1400 to teach pick and place points operates in essentially the same manner as described herein within respect to a robotic workcell. In this embodiment, the robot teach tool 300 is configured to interact with the plurality of modular workstations 1405 and the robotic arm 1425. In this embodiment, the robot teach tool 300 facilitates automatic learning of locations of the plurality of modular workstations 1405 with respect to the robotic arm 1425.

Before using the robot teach tool 300 in the modular robotic system 1400, the hardware and software associated with the teach tool needs to be initially set up. For the hardware set up, the robotic teach tool needs to be associated with robot input. In an embodiment where the robotic teach tool is a wired configuration, plugging the teach tool into the robot connector will initialize the set up, while for an embodiment where the teach tool is a wireless configuration; a wireless receiver will be configured to the robot input and output. For the software set up, a teach tool library needs to be uploaded into robot controller 1445. A "teach" function in the robot may need to be modified to provide the right input and output number.

Once the robot teach tool 300 has been set up for the modular robotic system 1400, the teach tool may be used to teach pick and place positions for the robotic arm 1425 from the mobile equipment carrying cart 1420. As mentioned above, the teach tool would teach pick and place positions from the mobile equipment carrying cart 1420 in the same manner described herein with respect to the robotic workcell.

Those skilled in the art will recognize that the use of a self-learning tool with a modular robotic system 1400 is not limited to the robot teach tool 300 described herein. Instead, any well-known self-learning tool can be implemented in this embodiment.

While the disclosure has been particularly shown and described in conjunction with preferred embodiments thereof, it will be appreciated that variations and modifications will occur to those skilled in the art. Therefore, it is to be understood that the appended claims are intended to cover all such modifications and changes as fall within the true spirit of the disclosure.

What is claimed is:

1. A robot teach tool, comprising:
a body assembly with a proximity sensor mounted therein that is releasably mated with a robot end effector;
a foot assembly coupled to the body assembly, wherein the foot assembly comprises a sensor target mounted therein that is located about the proximity sensor; and
wherein the proximity sensor and the sensor target are configured to detect signals representative of a perturbation as the robot end effector moves the body assembly and foot assembly from a central position within a workpiece receptacle through six degrees of freedom, wherein the signals are used to determine a precise orientation for the robot end effector to pick up and place a workpiece to and from the workpiece receptacle, wherein the signals representative of the perturbation are generated in response to the foot assembly colliding with a horizontal surface or a vertical surface of the workpiece receptacle.

2. The robot teach tool according to claim 1, wherein the body assembly comprises a plurality of registration features located on an exterior thereof to facilitate gripping thereof by the robot end effector.

3. The robot teach tool according to claim 1, wherein the body assembly comprises a plurality of bearings on the interior thereof to facilitate coupling with the foot assembly.

4. The robot teach tool according to claim 1, wherein the foot assembly comprises a plurality of parking station holes located throughout that facilitate coupling with a parking station.

5. The robot teach tool according to claim 1, wherein the foot assembly comprises a base section and a sensor target platform disposed on the base section.

6. The robot teach tool according to claim 5, wherein the sensor target platform comprises a plurality of bearing pockets configured to facilitate coupling with the body assembly.

7. The robot teach tool according to claim 5, wherein the sensor target is supported above the sensor target platform by a plurality of platform posts.

8. The robot teach tool according to claim 1, wherein the sensor target is located above the proximity sensor.

9. A system for automatically teaching a robot a plurality of pick and place positions, comprising:
a robot teach tool comprising a body assembly with a proximity sensor mounted therein and a foot assembly coupled to the body assembly, wherein the foot assembly comprises a sensor target mounted therein that is located about the proximity sensor, wherein the robot teach tool is separate and distinct from the robot without being physically integrated therewith; and
a robot controller that controls operation of the robot, wherein the robot controller directs a robot end effector to pick up the robot teach tool and move the robot teach tool from a central position within a workpiece receptacle through six degrees of freedom, the robot controller comprising a robot orienter that receives perturbation signals from the proximity sensor as the robot end effector moves the robot teach tool from the central position within the workpiece receptacle through the six degrees of freedom and determines a precise orientation of the plurality of pick and place positions from the perturbation signals, wherein the perturbation signals are generated in response to the foot assembly of the robot teach tool colliding with a horizontal surface or a vertical surface of the workpiece receptacle.

10. The system according to claim 9, wherein the proximity sensor detects a perturbation signal in response to sensing that the sensor target has moved a predetermined distance therefrom.

11. The system according to claim 10, wherein the proximity sensor detects that the robot teach tool is in the central position of the workpiece receptacle in response to sensing that the sensor target has moved back towards the proximity sensor.

12. The system according to claim 9, wherein the robot controller directs the robot end effector to further move the robot teach tool from the central position of the workpiece receptacle to a place position through three degrees of rotation.

13. The system according to claim 9, wherein the robot orienter determines the precise orientation of the plurality of pick and place positions by ascertaining coordinates of the robot teach tool during detection of the perturbation signals.

14. The system according to claim 13, wherein the robot orienter further determines the precise orientation of the plurality of pick and place positions by ascertaining coordinates of the robot teach tool in the central position where there are no collisions with any surface of the workpiece receptacle.

15. The system according to claim 9, wherein the robot controller stores the precise orientation of the plurality of pick and place positions determined by the robot orienter.

16. The system according to claim 15, wherein the robot controller uses the stored plurality of pick and place positions to direct the robot end effector to pick and place a workpiece to and from the workpiece receptacle.

17. The system according to claim 9, wherein the precise orientation of the plurality of pick and place positions determined by the robot orienter includes positions in the workpiece receptacle that are portrait or landscape.

18. A method for automatically teaching a robot a plurality of pick and place positions for a workstation located about the robot, comprising:
 providing a robot teach tool that is separate and distinct from the robot without being physically integrated therewith;
 directing a robot end effector to pick up the robot teach tool;
 directing the robot end effector to move the robot teach tool towards a workpiece receptacle located at the workstation to a central position and from the central position, to a place position in all six degrees of freedom;
 receiving perturbation signals detected from the teach tool as the robot end effector moves the robot teach tool from the central position with the workpiece receptacle through six degrees of freedom, wherein the perturbation signals are detected in response to the robot teach tool colliding with a horizontal surface or a vertical surface of the workpiece receptacle; and
 determining a precise orientation of the plurality of pick and place positions for the workpiece receptacle from the perturbation signals.

19. The method according to claim 18, wherein the determining of the precise orientation of the plurality of pick and place positions comprises ascertaining coordinates of the robot teach tool during detection of the perturbation signals.

20. The method according to claim 18, further comprising storing the precise orientation of the plurality of pick and place positions determined for the workstation by the robot orienter.

21. The method according to claim 20, further comprising using the stored plurality of pick and place positions to direct the robot end effector to pick and place a workpiece to and from the workpiece receptacle located at the workstation.

22. The method according to claim 18, further comprising directing the robot end effector to move the robot teach tool from the central position of the workpiece receptacle to a place position through three degrees of rotation.

23. A modular robotic system, comprising:
 a plurality of modular robotic workstations;
 a robot that moves material to and from each of the plurality of modular robotic workstations; and
 a robot teach tool configured to interact with the plurality of robotic modular workstations and the robot, wherein the robot teach tool facilitates automatic learning of pick and place locations of each of the plurality of modular robotic workstations, where the robot teach tool is separate and distinct from the plurality of modular robotic workstations and the robot without being physically integrated therewith.

24. The modular robotic system according to claim 23, wherein the robot teach tool comprises a body assembly with a proximity sensor mounted therein and a foot assembly coupled to the body assembly, wherein the foot assembly comprises a sensor target mounted therein that is located about the proximity sensor.

25. The modular robotic system according to claim 23, wherein each robotic modular workstation comprises a robot controller that controls operation of the robot with respect to the workstation, wherein the robot controller directs a robot end effector to pick up the robot teach tool and move the robot teach tool from a central position within a workpiece receptacle located on the workstation through six degrees of freedom, the robot controller comprising a robot orienter that receives perturbation signals from the proximity sensor as the robot end effector moves the robot teach tool from the central position within the workpiece receptacle through the six degrees of freedom and determines a precise orientation of the plurality of pick and place positions from the perturbation signals, wherein the perturbation signals are detected in response to the robot teach tool colliding with a horizontal surface or a vertical surface of the workpiece receptacle.

26. The modular robotic system according to claim 25, wherein the robot controller directs the robot end effector to further move the robot teach tool from the central position of the workpiece receptacle to a place position through three degrees of rotation.

27. The modular robotic system according to claim 25, wherein the robot orienter determines the precise orientation of the plurality of pick and place positions by ascertaining coordinates of the robot teach tool during detection of the perturbation signals.

28. The modular robotic system according to claim 25, wherein the robot orienter further determines the precise orientation of the plurality of pick and place positions by ascertaining coordinates of the robot teach tool in the central position wherein there are no collisions with any surface of the workpiece receptacle.

29. A method for automatically teaching a plurality of pick and place positions for a modular robotic system having a plurality of modular robotic workstations and a robot that moves material to and from each of the plurality of modular robotic workstations, the method comprising:
 providing a robot teach tool that is separate and distinct from the plurality of modular robotic workstations and the robot without being physically integrated therewith;
 directing the robot to pick up the robot teach tool;

directing the robot to move the robot teach tool towards a workpiece receptacle located at one of the plurality of modular robotic workstations;

directing the robot teach tool to a central position within the workpiece receptacle and from the central position, to a place position in all six degrees of freedom;

receiving perturbation signals detected from the robot teach tool as the robot end moves the robot teach tool from the central position with the workpiece receptacle through six degrees of freedom, wherein the perturbation signals are detected in response to the robot teach tool colliding with a horizontal surface or a vertical surface of the workpiece receptacle; and determining a precise orientation of the plurality of pick and place positions for the workpiece receptacle from the perturbation signals.

* * * * *